(12) United States Patent
Philip

(10) Patent No.: US 11,719,421 B1
(45) Date of Patent: Aug. 8, 2023

(54) RADIAL LIGHT

(71) Applicant: Walmart Apollo, LLC, Bentonville, AR (US)

(72) Inventor: George Philip, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 0 days.

(21) Appl. No.: 17/949,421

(22) Filed: Sep. 21, 2022

(51) Int. Cl.
*F21V 21/26* (2006.01)
*F21S 9/02* (2006.01)

(52) U.S. Cl.
CPC ............... *F21V 21/26* (2013.01); *F21S 9/02* (2013.01)

(58) Field of Classification Search
CPC .......... F21V 21/06; F21V 21/14; F21V 21/22; F21V 21/30
See application file for complete search history.

(56) References Cited

U.S. PATENT DOCUMENTS

| | | | |
|---|---|---|---|
| 10,948,166 B2 * | 3/2021 | Ohara | ................. F21V 21/0965 |
| 11,396,984 B1 | 7/2022 | Chao | |
| 2009/0135611 A1 * | 5/2009 | Lin | ........................... F21L 4/04 362/372 |
| 2011/0298351 A1 * | 12/2011 | Han | ......................... F21K 9/23 313/46 |
| 2017/0299151 A1 * | 10/2017 | Luo | ..................... F21V 19/0055 |
| 2018/0340661 A1 * | 11/2018 | Inskeep | ................... F21V 19/02 |
| 2019/0346122 A1 * | 11/2019 | Proeber | ................... F21L 14/04 |

FOREIGN PATENT DOCUMENTS

CN 209821575 U 12/2019

OTHER PUBLICATIONS

Unknown, "FT-SL6 SuperStar Digital Photography Light", FOSOTO, captured Aug. 11, 2022, 21 pages.

* cited by examiner

*Primary Examiner* — Eric T Eide
(74) *Attorney, Agent, or Firm* — Barta, Jones & Foley, PLLC

(57) ABSTRACT

A light includes a hub and an arm extending radially outward from the hub. The arm includes a light source configured to emit light from the arm. The arm is rotatably connected to the hub such that the arm is configured to rotate about a longitudinal axis of the hub between an extended angular position and a folded angular position. The arm extends radially outward from the hub in a different radial direction in the extended angular position as compared to the folded angular position.

20 Claims, 13 Drawing Sheets

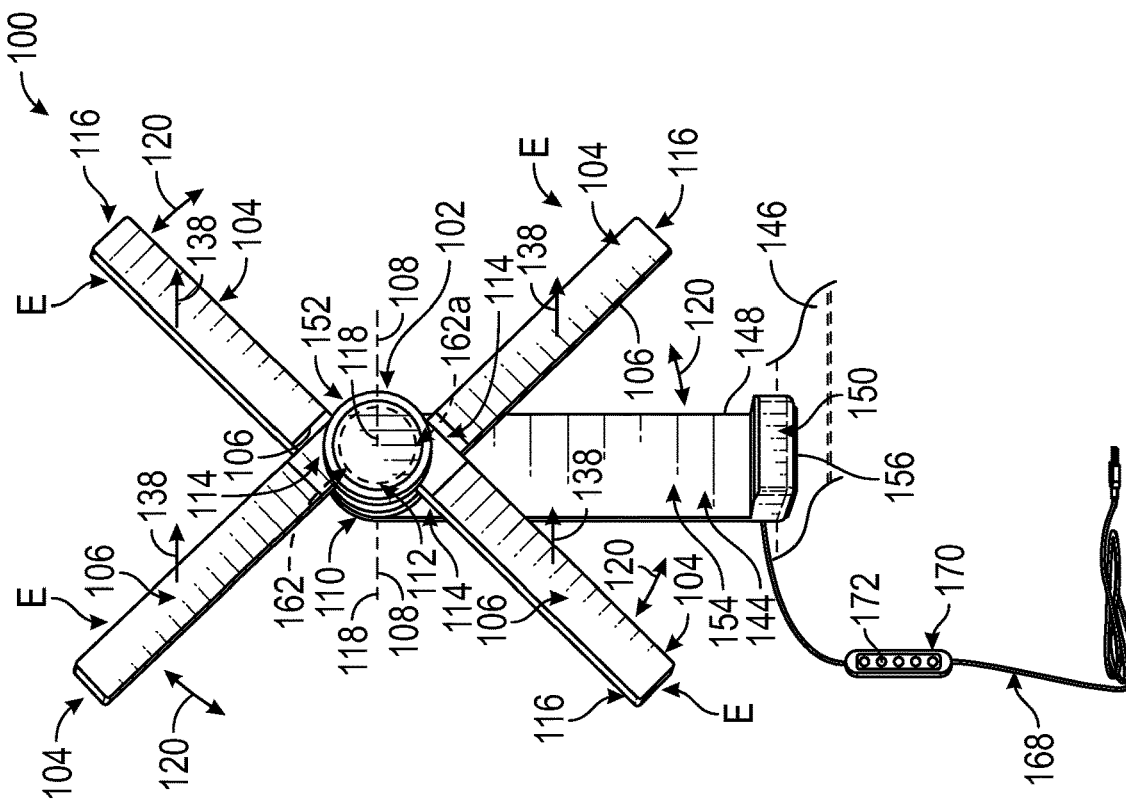
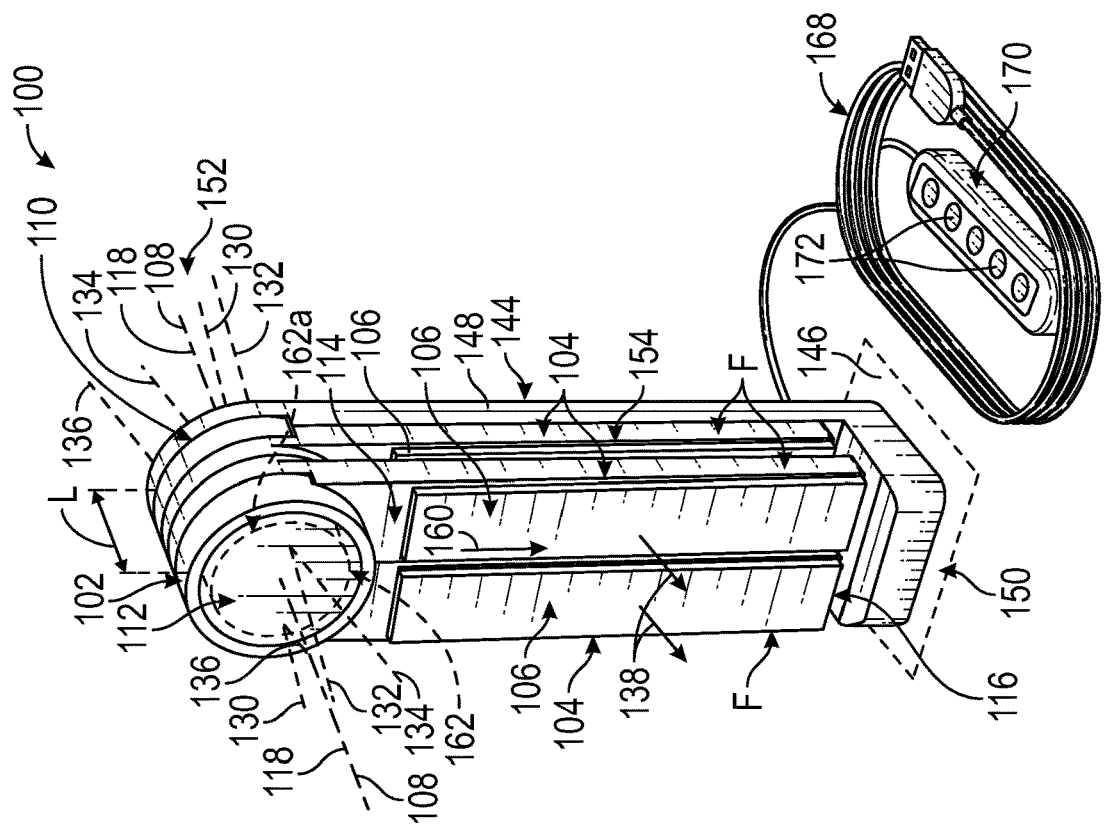

RADIAL LIGHT

BACKGROUND

A ring light is a lighting tool that is used to provide lighting for a variety of video and photographic applications. For example, ring lights are commonly used for lighting macro photography, portraits, beauty shots, selfies, makeup videos, other video and/or social media content, etc. Known ring lights include either a single circular light bulb or a plurality of light bulbs arranged in a circle. The circular pattern of the light bulb(s) emits a relatively even, diffuse lighting that facilitates reducing shadows.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

According to a first aspect there is a light that includes a hub and an arm extending radially outward from the hub. The arm includes a light source configured to emit light from the arm. The arm is rotatably connected to the hub such that the arm is configured to rotate about a longitudinal axis of the hub between an extended angular position and a folded angular position. The arm extends radially outward from the hub in a different radial direction in the extended angular position as compared to the folded angular position.

The light may include a plurality of arms that, in the folded angular positions, extend radially outward from the hub in approximately the same radial direction as compared to each other.

The longitudinal axis of the hub may be a central longitudinal axis of the hub.

The light may include a plurality of arms that share a common axis of rotation about the hub.

The arm may be configured to be held in an intermediate angular position wherein the arm extends radially outward from the hub in a different radial direction as compared to the extended and folded angular positions.

The light may include a base that holds the hub, wherein the base is configured to support the hub on a surface.

The light may include a base that is configured to hold a battery for providing the light source with electrical power.

The light may include a power cord operatively connected to the light source such that the power cord is configured to provide the light source with electrical power from a power source.

The light may include at least one of a tri-pod mount or a magnetic mount.

At least one of a size, footprint, or form-factor of the light may be reduced in the folded angular position of the arm as compared to extended angular position of the arm.

According to a second aspect there is a light that includes a hub and a plurality of arms held by the hub such that the arms extend radially outward from the hub. Each respective arm includes a light source configured to emit light from the arm in an emission direction. The arms are rotatably connected to the hub such that the arms are configured to rotate about the hub between extended angular positions and folded angular positions. The arms are configured to rotate between the extended and folded angular positions about at least one axis of rotation that extends approximately parallel to the emission direction.

The folded angular positions of the arms may extend radially outward from the hub in approximately the same radial direction as compared to each other.

The at least one axis of rotation may be shared between the arms as a common axis of rotation.

The arms may be configured to be held in intermediate angular positions wherein each arm extends radially outward from the hub in a different radial direction as compared to the extended and folded angular positions of the arm.

The hub may include a detent configured to hold an arm of the arms in the extended angular position or the folded angular position of the arm.

The light may include a base that holds the hub. The base is configured to support the hub on a surface.

The light may include a base that includes a pedestal extending a height from a foot to a top. The pedestal may include a cradle extending between the foot and the top, wherein the cradle is configured to receive the arms therein in the folded angular positions of the arms.

At least one of a size, footprint, or form-factor of the light may be reduced in the folded angular positions of the arms as compared to extended angular positions of the arms.

According to a third aspect there is a method for assembling a light. The method includes supporting a hub; and mounting arms that include light sources to the hub such that the arms extend radially outward from the hub and such that the arms are configured to rotate about at least one longitudinal axis of the hub between extended angular positions and folded angular positions of the arms.

Mounting the arms to the hub may include mounting the arms to the hub such that the folded angular positions of the arms extend radially outward from the hub in approximately the same radial direction as compared to each other.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 1 is an isometric view of an exemplary radial light according to an implementation.

FIG. 2 is an isometric view of the radial light shown in FIG. 1 illustrating the light in a deployed configuration according to an implementation.

Like reference numerals are used to designate like parts in the accompanying drawings.

DETAILED DESCRIPTION

Figure 4:
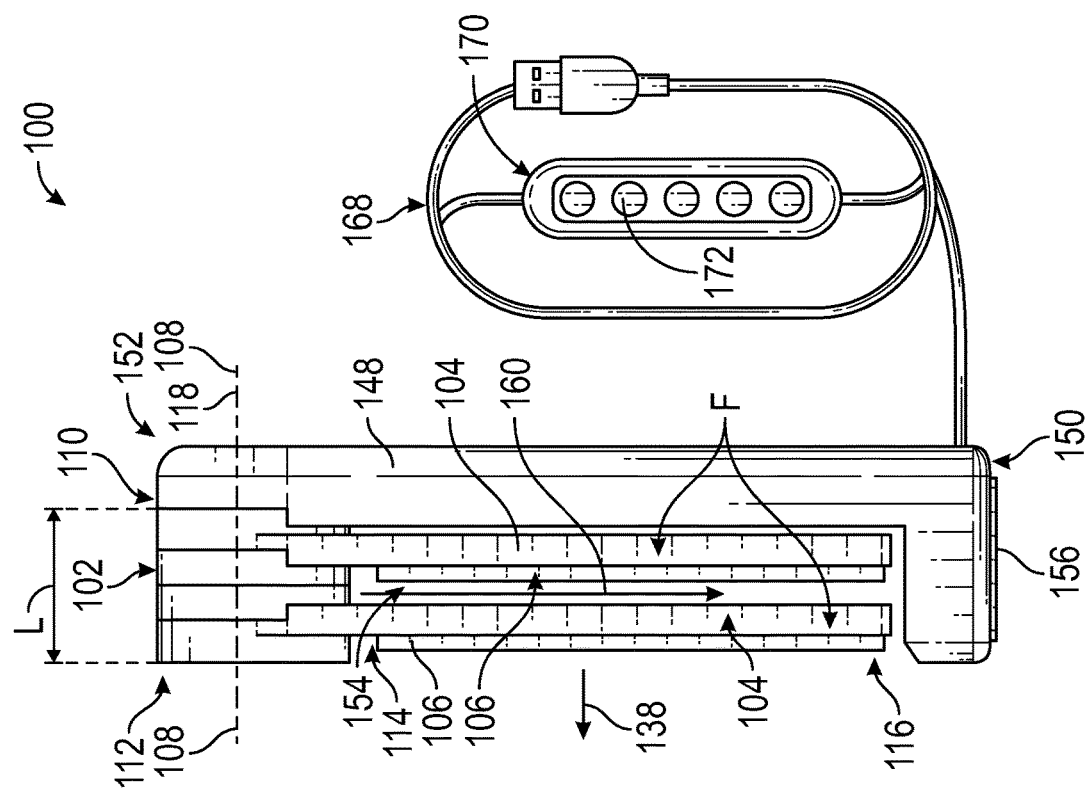
FIG. 4 is a side elevational view of the radial light shown in FIGS. 1-3 illustrating the light in a collapsed configuration according to an implementation.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

While various spatial and directional terms, such as "top," "bottom," "front," "rear," "upper," "lower," "vertical," "upward," and/or the like are used to describe implementations of the present application, it is understood that such terms are merely used with respect to the orientations shown in the drawings. The orientations can be inverted, rotated, or otherwise changed such that the spatial and directional terms apply differently, for example if the structure is flipped 180°: a top side becomes a bottom side; upward becomes downward; a left side becomes a right side; vice versa; and/or the like. Moreover, and for example, vertical may become horizontal when the structure is rotated 90°.

As used herein, a light "source" and a light "bulb" each may include any type of light source that enables the lights disclosed herein to function as described and/or illustrated herein, such as, but not limited to, incandescent light sources (e.g., a filament lamp, a halogen lamp, a coiled filament lamp, a tungsten filament lamp, a carbon filament lamp, etc.), gas-discharge light sources (e.g., a fluorescent lamp, a carbon arc lamp, a hot cathode lamp, a cold cathode lamp, a low pressure discharge lamp, a high pressure discharge lamp, a high-intensity discharge lamp, a Xenon flash lamp, etc.), light emitting diodes (LEDs; e.g., an LED lamp, etc.), strobe lights, constant lights, and/or the like.

As briefly described above, known ring lights include either a single circular light bulb or a plurality of light bulbs arranged in a circle. Ring lights come in a variety of sizes, for example ranging from six to twenty inches in diameter. However, known ring lights are relatively large and/or cumbersome because of the continuous circular shape thereof. For example, even for relatively smaller diameter ring lights, the circular shape reduces the portability of the light such that the light is more difficult and/or inconvenient to be carried by a user and/or to be packed within a bag, purse, and/or other container. Accordingly, it may be difficult and/or inconvenient to travel with known ring lights, for example. Moreover, and for example, the circular shape of ring lights may limit the applications and/or environments within which a ring light may be used (e.g., limited-space applications, remote environments, etc.), may prevent the use of a ring light (e.g., while a user is traveling, etc.), and/or may require use of a smaller diameter ring light that provides reduced lighting. The examples described below are not limited to implementations which solve any or all of the disadvantages of known ring lights.

Certain implementations provide a light that includes a hub and an arm extending radially outward from the hub. The arm includes a light source configured to emit light from the arm. The arm is rotatably connected to the hub such that the arm is configured to rotate about the hub between an extended angular position and a folded angular position (which may be also viewed as a retracted position).

Certain implementations provide a light that is configured to emit approximately even, diffuse lighting. Certain implementations provide a light with one or more rotating arms that can be moved (i.e., rotated) to a folded angular position that reduces the size, footprint, form-factor, and/or the like of the light. For example, the light is collapsible from an extended angular position of the arms to the folded angular positions of the arms by rotating (e.g., folding, etc.) the arms from the extended angular positions to the folded angular positions. In some examples, the light is lighter as compared to at least some known ring lights (e.g., ring lights that are configured to emit substantially the same amount, intensity, and/or the like of light, etc.), for example because the light-emitting arms have less mass as compared to the continuous ring structure of known ring lights, etc. Moreover, certain implementations provide a light configured to provide more adaptable, flexible, variable, and/or the like patterns of lighting (e.g., as compared to at least some known ring lights, etc.). For example, the radial pattern of the arms can be varied (e.g., by moving one or more of the arms to an intermediate angular position, by adjusting the angular position of one or more of the extended angular positions, etc.) to emit various different patterns of light.

The collapsed configuration of the light and/or a reduced weight of the light make it easier and more convenient to carry, move, store, and/or the like (e.g., the light takes up less space in the collapsed configuration, for example as compared to at least some known ring lights, etc.). In some examples, the light is portable (e.g., capable of being carried and moved by a single human being; capable of being carried in a bag, purse, and/or other container that has a size and weight that can be carried and moved by a single human being; etc.). For example, the collapsible function of the light may enable the light to be portable when the arms are in the folded angular positions. In some examples, the light is portable when the arms are in the extended angular positions. For example, the radial structure (i.e., extending radially outward from the hub) of the arms in the extended angular positions may take up less space (e.g., as compared to the continuous ring structure of known ring lights, etc.) such that the light is portable even when the arms are in the extended angular positions.

In some examples, the light is capable of being hand-held such that the light is configured to be operated while held by a user's hand. For example, a base, the hub, an arm, and/or the like of the light can be held by the user's hand when the arms are in the extended angular positions such that the light can be operated while held by the user's hand. Moreover, and for example, a reduced weight of the light and/or the radial structure of the arms in the extended angular positions (e.g., which may take up less space, for example as compared to the continuous ring structure of known ring lights, etc.) may enable the light to be more easily operated when held by a user's hand, for example as compared to at least some known ring lights, etc.

Figure 3:
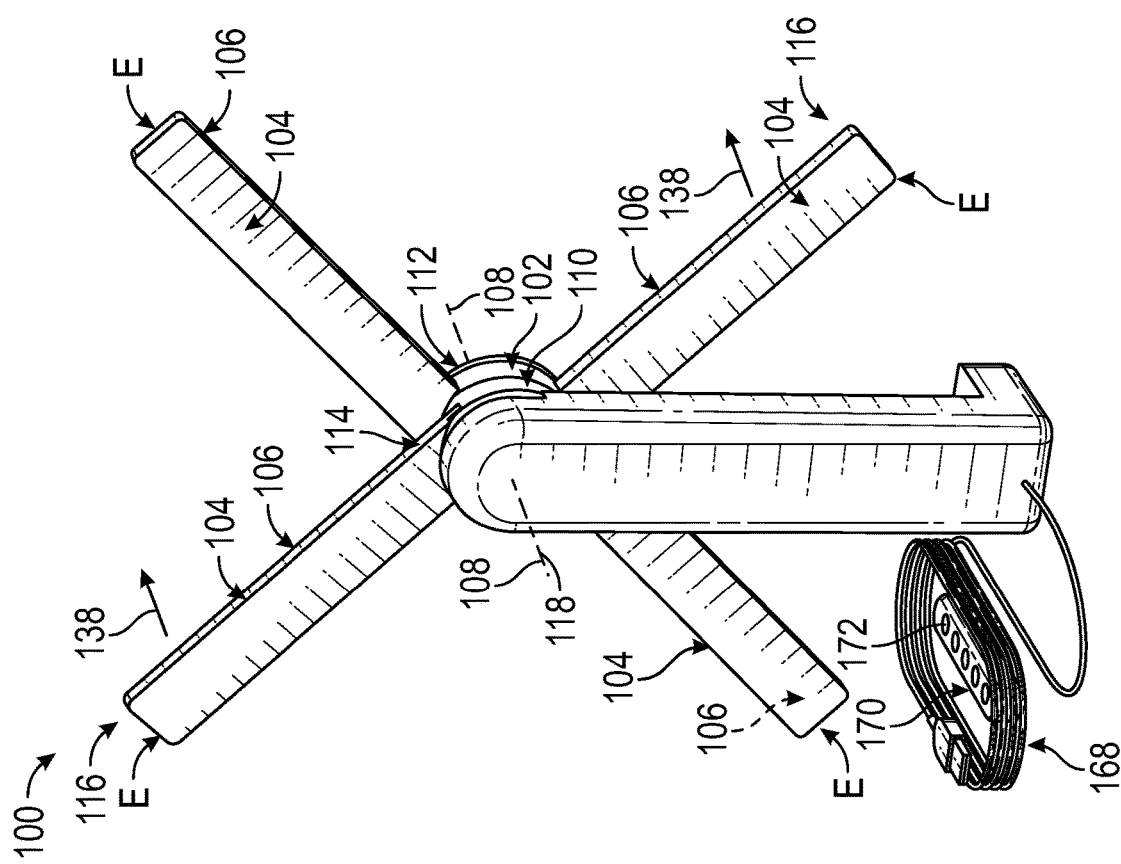
FIG. 3 is a rear isometric view of the radial light shown in FIGS. 1 and 2 illustrating the light in the deployed configuration according to an implementation.

Referring now to FIGS. 1-4, according to an implementation, a radial light 100 includes a hub 102 and one or more elongate arms 104 that extend radially outward from the hub 102. The arms 104 include light sources 106 that are configured to emit light from the arms 104. As will be described below, the arms 104 are configured to rotate about the hub 102 between extended angular positions and folded angular positions. The light 100 is thereby collapsible from a deployed configuration, wherein the arms 104 are at the extended angular positions, to a collapsed configuration wherein the arms 104 are at the folded angular positions. An example of the deployed configuration of the light 100 is shown in FIGS. 2 and 3, with FIGS. 1 and 4 illustrating an example of the collapsed configuration of the light 100. Although four arms 104 are shown herein, the light 100 may include any number of the arms 104.

As shown in FIGS. 1 and 4, the hub 102 extends a length L along a central longitudinal axis 108 from a rear 110 of the hub 102 to a front 112 of the hub 102. Each arm 104 extends a length radially outward from the hub 102 from a base 114 of the arm 104 to a tip 116 of the arm 104. As briefly described above, the arms 104 are rotatably connected to the hub 102 such that the arms 104 are configured to rotate about the hub 102. For example, each arm 104 is held by the hub 102 such that the arm 104 is configured to rotate about an axis or rotation 118 of the hub 102 between an extended angular position E (e.g., as shown in FIGS. 2 and 3, etc.) of the arm 104 and a folded angular position F (e.g., as shown in FIGS. 1 and 4, etc.) of the arm 104. Exemplary movement (i.e., rotation) of the arms 104 between (e.g., to, from, etc.) the folded angular positions F and the extended angular positions E is illustrated with the arrows 120 in FIGS. 2 and 5. As should be apparent from FIGS. 1-4, in the exemplary implementation of a deployed configuration shown in FIGS. 2 and 3, each arm 104 extends radially outward from the hub 102 in a different radial direction in the extended angular position E of the arm 104 as compared to the folded angular position F of the arm 104. Although shown has having a generally cylindrical shape (e.g., the circular front face shown best in FIG. 5, etc.), the hub 102 may additionally or alternatively include any other geometry than shown and/or described herein (e.g., rectangular, triangular, square, oval, five or more sided, etc.).

Referring now to FIGS. 1, 2, and 4-6, in the exemplary implementation of the light 100, each of the arms 104 rotates between the extended and folded angular position E and F, respectively, about the central longitudinal axis 108 of the hub 102. In other words, the arms 104 share the central longitudinal axis 108 as a common axis of rotation 118 about the hub 102. However, the axes of rotation 118 of the arms 104 are not limited to being the central longitudinal axis 108, nor are the arms 104 limited to sharing a common axis of rotation 118. Rather, each arm 104 may rotate about any axis of rotation 118 of the hub 102 that enables the arm 104 to function as described and/or illustrated herein (e.g., to rotate between the respective extended and folded angular positions E and F, etc.). For example, one or more arms 104 may rotate about a different axis of rotation 118 of the hub 102 as compared to one or more other arms 104. In some examples, two or more of the arms 104 rotate about two or more different axes of rotation 118 that extend approximately parallel to each other (e.g., two or more arms 104 that share a common axis of rotation 118; axes that are offset from each other along the hub 102; the longitudinal axes 122, 124, 126, and/or 128 shown in FIG. 5; the axes 130 and 132 shown in FIG. 1; the axes 134 and 136 shown in FIG. 1; etc.). Examples of axes of rotation 118 about which an arm 104 may rotate about the hub 102 between the respective folded and extended angular positions F and E include, but are not limited to, a non-central longitudinal axis of the hub 102 (i.e., a longitudinal axis of the hub 102 that is offset radially from the central longitudinal axis 108; e.g., the longitudinal axes 122, 124, 126, and/or 128, etc.), an axis of the hub 102 that extends at an oblique angle relative to the central longitudinal axis 108 (e.g., the axes 130, 132, 134, and/or 136, etc.), and/or the like.

In some examples, the axis of rotation 118 of one or more of the arms 104 extends approximately parallel to an emission direction (e.g., the emission direction 138 described below, etc.) in which the light sources 106 of the arms 104 are configured to emit light therefrom. For example, in the exemplary implementation of the light 100, the central longitudinal axis 108 of the hub 102 extends approximately parallel to the emission direction 138.

Figure 5:
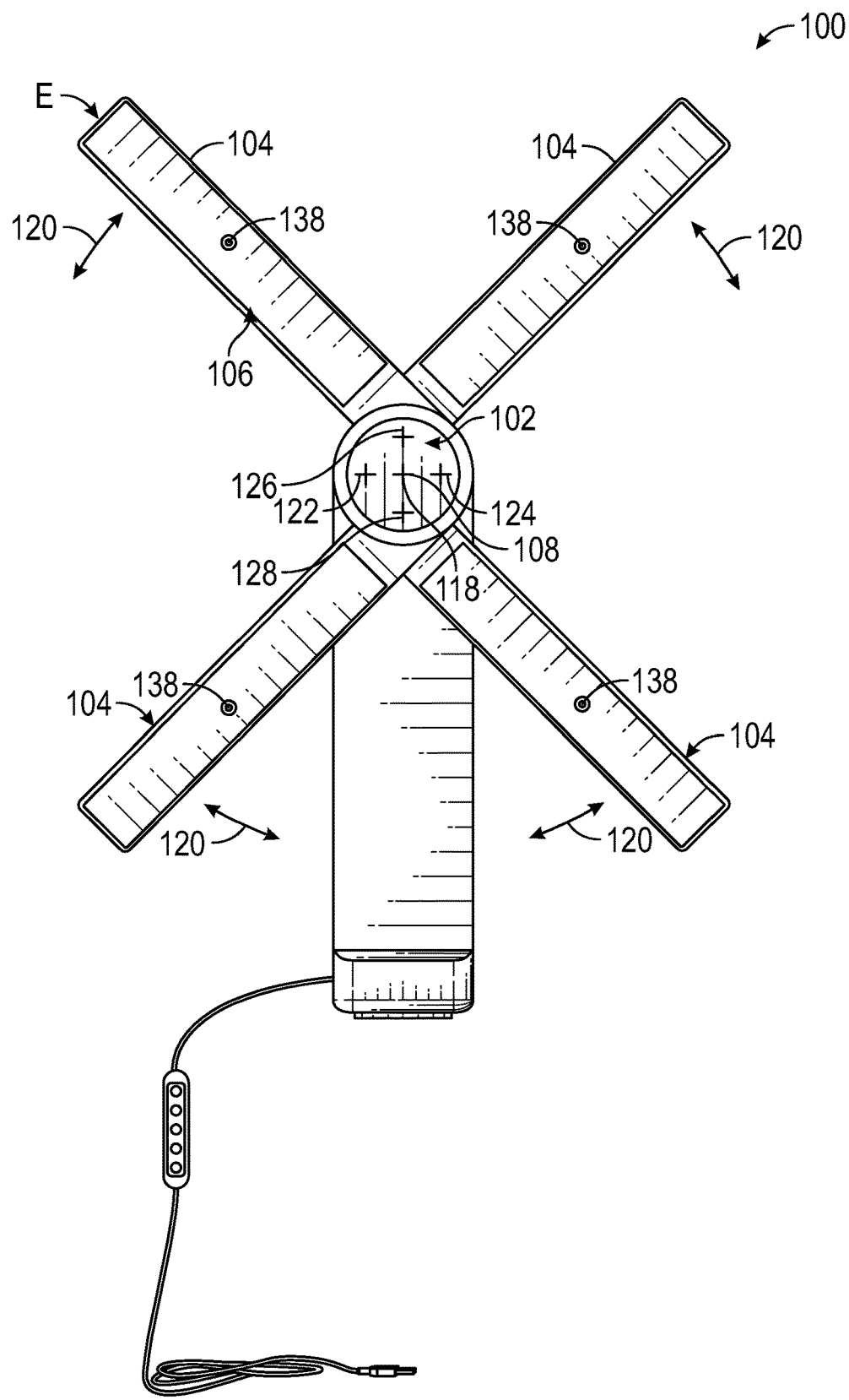
FIG. 5 is a front elevational view of the radial light shown in FIGS. 1-4 illustrating the light in the deployed configuration according to an implementation.
Figure 6:
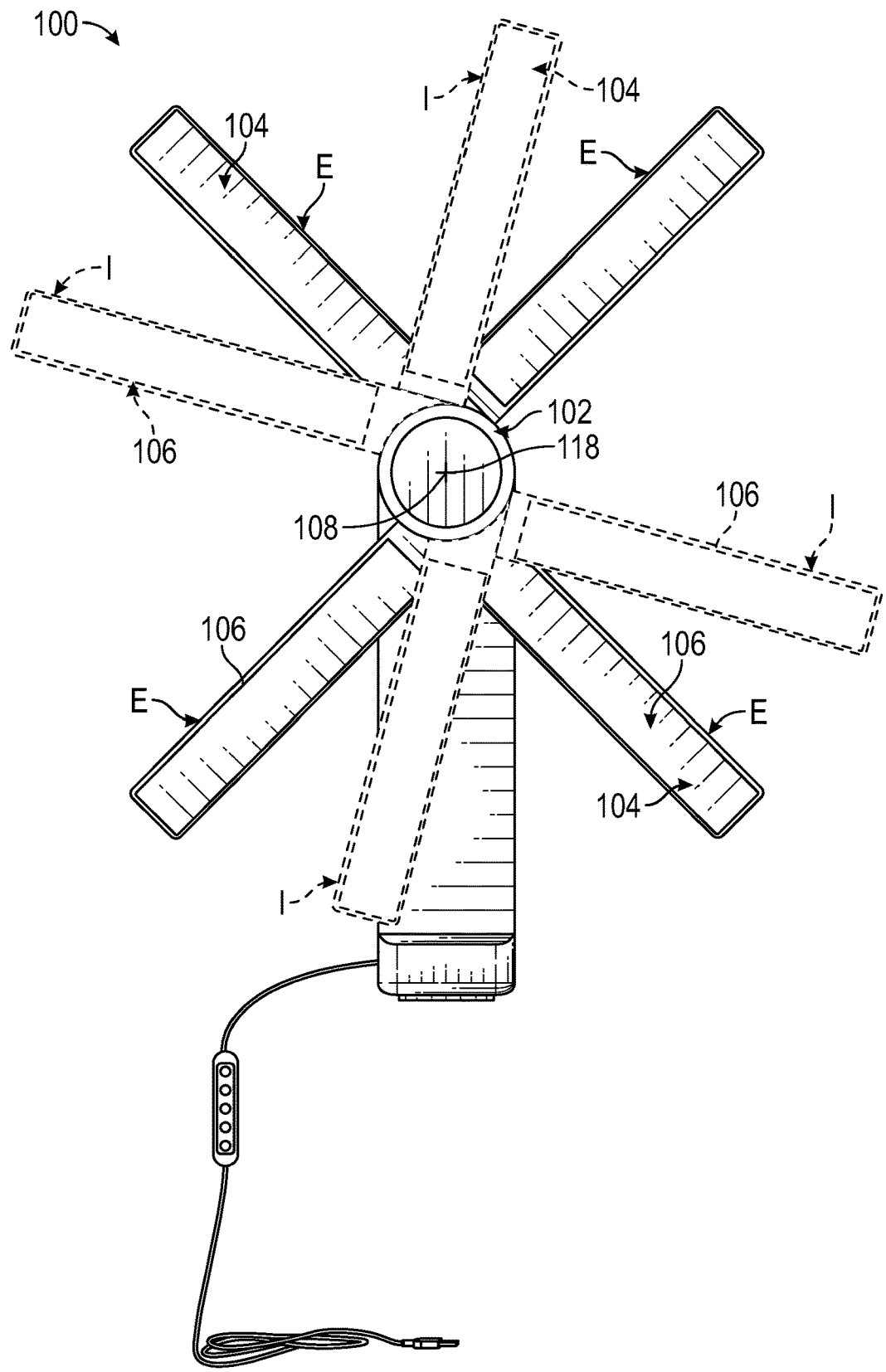
FIG. 6 is a front elevational view of the radial light shown in FIGS. 1-5 illustrating intermediate angular positions of arms of the light according to an implementation.

As for example illustrated in FIGS. 5 and 6, each arm 104 is independently rotatable (i.e., movable) about the hub 102 in a clockwise direction and/or a counterclockwise direction from the folded angular position F to the extended angular position E thereof, and vice versa. In some examples, each arm 104 is independently positionable at any angular position (i.e., an any angle between 0° and 360°) between the extended angular position E and the folded angular position F thereof. For example, FIG. 6 illustrates exemplary intermediate angular positions I of the arms 104 wherein each arm 104 extends radially outward from the hub 102 in a different radial direction as compared to the extended angular position E and the folded angular position F of the arm 104. The particular patterns of the angular positions (e.g., the extended angular positions E, the intermediate angular positions I, etc.) of the arms 104 shown herein are meant only as exemplary and non-limiting. For example, the extended angular position E and/or any intermediate position I of each arm 104 about the hub 102 and relative to each other arm 104 may have any angular value that enables the light 100 to function as described and/or illustrated herein (e.g., to emit light, to emit a particular pattern of light, etc.).

In some examples, the hub 102 is configured to removably hold one or more of the arms 104 in one or more angular positions (e.g., the extended angular position E, the folded angular position F, the intermediate position I, etc.), for example to enable a user to selectively (e.g., independently, etc.) position each arm 104 at the one or more angular positions. For example, the hub 102 optionally includes a detent, resistance to rotation, friction, stiction, latch, lock, pin, clip, set screw, spring, damper, other mechanism, and/or the like that is configured to removably hold an arm 104 in one or more angular positions about the hub 102. In some examples, resistance to rotation, friction, stiction, and/or the like is used to enable a user to selectively (e.g., independently, etc.) position and removably hold an arm 104 in any angular position (e.g., any angular position between the extended angular position E and the folded angular position F, etc.) about the hub 102. In some examples, a plurality of detents provides discrete intermediate angular positions that are spaced apart between the extended angular position E and the folded angular position F of an arm 104.

One or more of the arms 104 may be provided with one or more stops (not shown) that prevent the arm 104 from rotating past the extended angular position E and/or the folded angular position F. In some examples, one or more of the arms 104 is configured to rotate at least approximately 360° in a clockwise direction and/or a counterclockwise direction.

As briefly described above, the arms 114 include the light sources 106 that are configured to emit light from the arms 104. Each light source 106 emits light from the corresponding arm 104 in an emission direction 138. In the exemplary implementation, the light sources 106 are shown as approximately flat (e.g., planar, etc.) sheets. However, each light source 106 additionally or alternatively includes any other shape. In some examples, one or more of the light sources 106 includes a curved and/or multi-sided light source (e.g., a curved light bulb, a cylindrical light bulb, a multi-faceted light bulb, etc.) such that the light source 106 is configured to emit light in one or more other directions in addition to the emission direction 138.

Each light source 106 is configured to emit light therefrom in one or more colors, one or more color temperatures, one or more brightness levels, one or more intensity levels, and/or the like. Moreover, and for example, each light source 106 may be configured to emit constant light and/or strobe light. In some examples, one or more of the light sources 106 is configured to emit light over a range of different colors, temperatures, brightness levels, intensity levels, and/or the like. In some examples, one or more the arms 104 is configured with one or more light sources 106 such that the arm 104 is configured to emit a variety of different patterns of color, temperature, brightness, intensity, and/or the like along the length and/or a width of the arm 104. Accordingly, the light 100 may be configured to emit a variety of different colors, temperatures, brightness levels, intensities, patterns thereof, and/or the like in the emission direction 138. In some other examples, the light source(s) 106 of one or more of the arms 104 is configured to emit only a single color and/or temperature of light.

Each arm 104 may include any number and any type(s) of the light sources 106. The light source(s) 106 on each arm 104 may include any number of different types of light sources and may be arranged in any pattern along the arm 104. Examples of the light sources 106 include, but are not limited to, incandescent light sources (e.g., a filament lamp, a halogen lamp, a coiled filament lamp, a tungsten filament lamp, a carbon filament lamp, etc.), gas-discharge light sources (e.g., a fluorescent lamp, a carbon arc lamp, a hot cathode lamp, a cold cathode lamp, a low pressure discharge lamp, a high pressure discharge lamp, a high-intensity discharge lamp, a Xenon flash lamp, etc.), light emitting diodes (LEDs; e.g., an LED lamp, etc.), strobe lights, constant lights, and/or the like.

Operation (e.g., function, etc.) of the light 100 in the deployed configuration with the arms 104 in the extended angular positions E will now be described with reference to FIGS. 2, 3, 5, and 6. In operation, the light sources 106 emit light from the arms 104 in the emission direction 138. As should be apparent from at least FIGS. 1-4, the exemplary implementation of the extended angular positions E of the arms 104 extend radially outward from the hub 102 in different radial directions as compared to each other. The pattern of the extended angular positions E of the arms 104 in the deployed configuration may be configured to emit approximately even, diffuse light in the emission direction 138. In the exemplary implementation shown herein, the arms 104 include first and second pairs 104a and 104b, respectively, of the arms 104, wherein the extended angular positions E of the pairs 104a and 104b are approximately evenly spaced apart from each other along the perimeter of the hub 102. However, the particular pattern of the extended angular positions E of the arms 104 shown herein is meant only as exemplary and non-limiting. For example, the extended angular positions E of the arms 104 may additionally or alternatively include any other pattern, for example which may be selected to facilitate emitting approximately even, diffuse light in the emission direction 138.

The pattern of light emitted by the light 100 in the emission direction 138 can be adjusted by changing the radial pattern of the arms 104 about the hub 102. For example, a user can use their hand and/or a tool (not shown) to move (i.e., rotate about the hub 102) one or more of the arms 104 to a different angular position about the hub 102. By changing the angular position about the hub 102 of one or more of the arms 104 relative to the angular position about the hub 102 of one or more other arms 104, the user can change the pattern of light emitted by the arms 104 in the emission direction 138. Accordingly, and for example, a user can adjust the positions of the arms 104 to select a radial pattern of the arms 104 that emits a desired pattern of light. It should be appreciated that adjustability of the angular positions of the arms 104 about the hub 102 provides a relatively large number (e.g., unlimited, infinite, thousands, millions, etc.) of different combinations of relative angular positions of the arms 104, which enables a user to select a variety of different patterns of emitted light. In one example, because some radial patterns of the arms 104 may emit light that is more even and/or diffuse as compared to the light emitted by other radial patterns of the arms 104, a user can change the positions of the arms 104 to select a radial pattern of the arms 104 that provides a desired level of evenness and/or diffusion of the emitted light. The adjustability of the angular positions of the arms 104 thus enables the light 100 to provide more adaptable, flexible, variable, and/or the like patterns of lighting, for example as compared to at least some known ring lights, etc. Moreover, the relatively simple and easy adjustment of rotating the angular positions of the arms 104 provides a light 100 that can be relatively quickly and conveniently switched between a variety of different lighting patterns.

One example of a different radial pattern of the arms 104 is shown in FIG. 6. For example, the intermediate angular positions I of the arms 104 shown in FIG. 6 illustrate a radial pattern of the arms 104 that is different than the radial pattern of the arms 104 in the extended angular positions E. The radial pattern of the intermediate angular positions I of the arms 104 provides a different emission pattern as compared to the emission pattern of light emitted by the arms 104 in the extended angular positions E.

Figure 7:
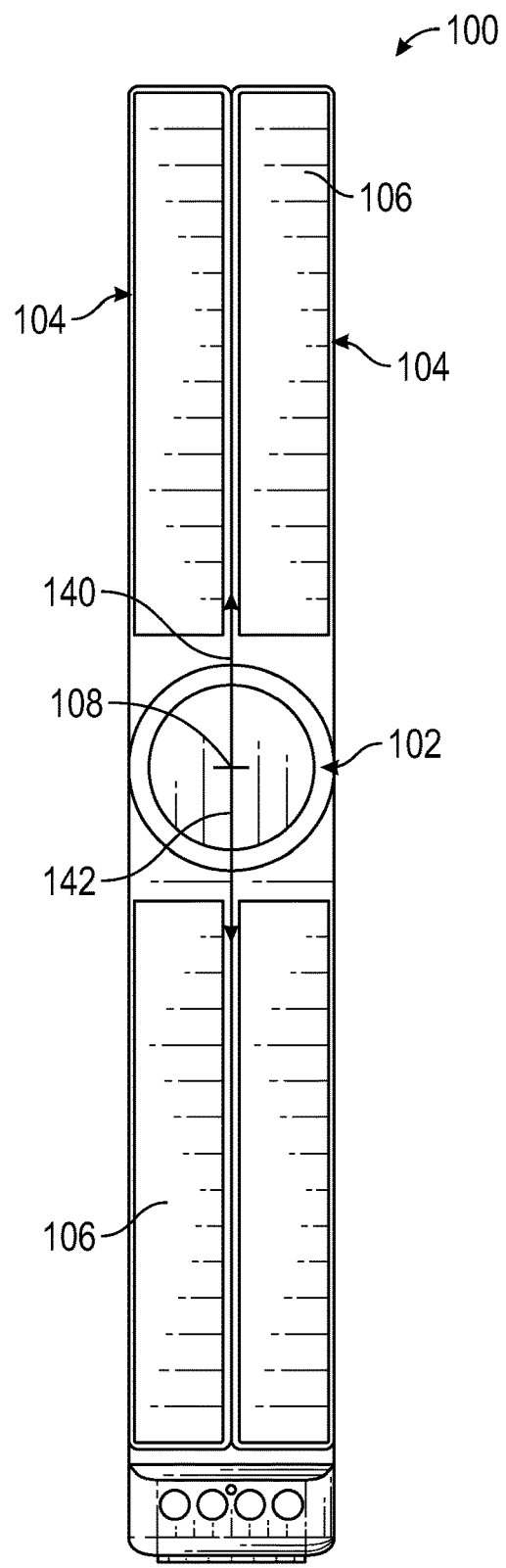
FIG. 7 is a front elevational view of the radial light shown in FIGS. 1-6 illustrating a linear radial pattern of the arms according to an implementation.

Another example of a radial pattern of the arms 104 is shown in FIG. 7. For example, the arms 104 have been moved to a linear radial pattern wherein the arms 104 extend radially outward from the hub 102 in approximately parallel radial directions 140 and 142 as compared to each other. In other words, the radial pattern of the arms 104 in FIG. 7 forms a light bar. The light bar formed by a linear radial pattern of the arms 104 is not limited to the orientation (e.g., relative to the hub 102, relative to a base of the light 100, relative to a surface on which the light 100 is supported, etc.) shown in FIG. 7. Rather, the light bar formed by a linear radial pattern of the arms 104 may have any other orientation (e.g., relative to the hub 102, relative to a base of the light 100, relative to a surface on which the light 100 is supported, etc.), for example an orientation that extends approximately perpendicular to the orientation shown in FIG. 7, an orientation that extends at an oblique angle relative to the orientation shown in FIG. 7, etc.

The radial pattern of the arms 104 enables the light 100 to generate a unique (e.g., as compared to at least some known ring lights, etc.) catch light (i.e., eye light) in the user's eyes. For example, the light emitted by the light 100 may cause the appearance of catch lights in the eyes of a user. The radial pattern of the arms 104 generates a catch light that has a radial pattern that mirrors the radial pattern of the arms 104. The radial pattern of the catch light generated by the light 100 is unique (e.g., as compared to the circular catch lights generated by known ring lights, etc.), which enables the user to add a unique enhancement to the appearance of their eyes in photos, videos, live streams, and/or the like. For example, users are not limited to catch lights appearing as circular. Moreover, the adjustability of the angular positions of the arms 104 enables the light 100 to provide a variety of different patterns of catch lights. The relatively simple and easy adjustment of the angular positions of the arms 104 enables the user to relatively quickly and conveniently switch between different catch light patterns.

The light 100 may be lighter as compared to at least some known ring lights (e.g., ring lights that are configured to emit substantially the same amount, brightness, intensity, and/or the like of light, etc.), for example because the light-emitting arms 104 have less mass as compared to the continuous ring structure of known ring lights, etc. In some examples, the light 100 has a geometry (e.g., size, shape, etc.) that is portable when the arms 104 are in the extended angular positions E. A reduced weight of the light 100 may facilitate portability of the light 100 in the extended angular positions E of the arms 104. For example, the radial pattern of the arms 104 in the extended angular positions E may take up less space (e.g., as compared to the continuous ring structure of known ring lights, etc.) such that the light 100 is portable even when the light is in a deployed configuration. Moreover, a reduced weight of the light 100 may facilitate portability of the light 100 in the extended angular positions E of the arms 104.

In some examples, the light 100 is capable of being hand-held such that the light 100 is configured to be operated while held by a user's hand. For example, a base (e.g., the base 144 described below, etc.), the hub 102, an arm 104, and/or the like of the light 100 can be held by the user's hand when the arms 104 are in the extended angular positions E such that the light 100 can be operated while held by the user's hand. Moreover, and for example, a reduced weight of the light and/or the radial pattern of the arms 104 in the extended angular positions E (e.g., which may take up less space, for example as compared to the continuous ring structure of known ring lights, etc.) may enable the light 100 to be more easily operated when held by a user's hand, for example as compared to at least some known ring lights, etc.

Various functions of the light 100 (e.g., powering the light 100 on and off, changing an intensity and/or a brightness level of emitted light, changing a color of emitted light, changing a temperature of emitted light, changing a pattern of emitted light, etc.) may be controlled by the user during operation of the light 100 using one or more control buttons and/or other inputs (e.g., the control unit 170 shown in FIGS. 1-6, 9, and 10, the control buttons 172 shown in FIGS. 1-6, 9, and 10, the control buttons 372 shown in FIGS. 11, 12, 15, and 16, etc.).

As briefly described above, the light 100 is collapsible from the exemplary deployed configuration, wherein the arms 104 are at the extended angular positions E, to the exemplary collapsed configuration wherein the arms 104 are at the folded angular positions F. For example, the light 100 is collapsible from the extended angular positions E of the arms 104 to the folded angular positions F of the arms 104 by rotating (e.g., moving, folding, etc.) the arms 104 about the hub 102 from the extended angular positions E to the folded angular positions F. As shown in FIGS. 1 and 4, in the exemplary implementation of the folded angular positions F, the arms 104 extend radially outward from the hub 102 in approximately the same radial direction 160 as compared to each other.

In the collapsed configuration shown in FIGS. 1 and 4, the light 100 has a reduced size, footprint, form-factor, and/or the like as compared to the deployed configuration of the light 100. In other words, folding the light 100 from the deployed configuration into the collapsed configuration reduces the size, footprint, form-factor, and/or the like of the light 100. In some examples, the collapsed configuration of the light 100 has a reduced size, footprint, form-factor, and/or the like as compared to at least some known ring lights.

The collapsed configuration of the light 100 and/or a reduced weight of the light 100 make it easier and more convenient to carry, move, store, and/or the like (e.g., the light takes up less space in the collapsed configuration, for example as compared to at least some known ring lights, etc.). In some examples, the collapsed configuration of the light 100 and/or a reduced weight of the light 100 provide the light 100 as portable (e.g., capable of being carried and moved by a single human being; capable of being carried in a bag, purse, and/or other container that has a size and weight that can be carried and moved by a single human being; etc.). For example, the collapsible function of the light 100 may enable the light 100 to be portable when the arms 104 are in the folded angular positions F.

Figure 8:
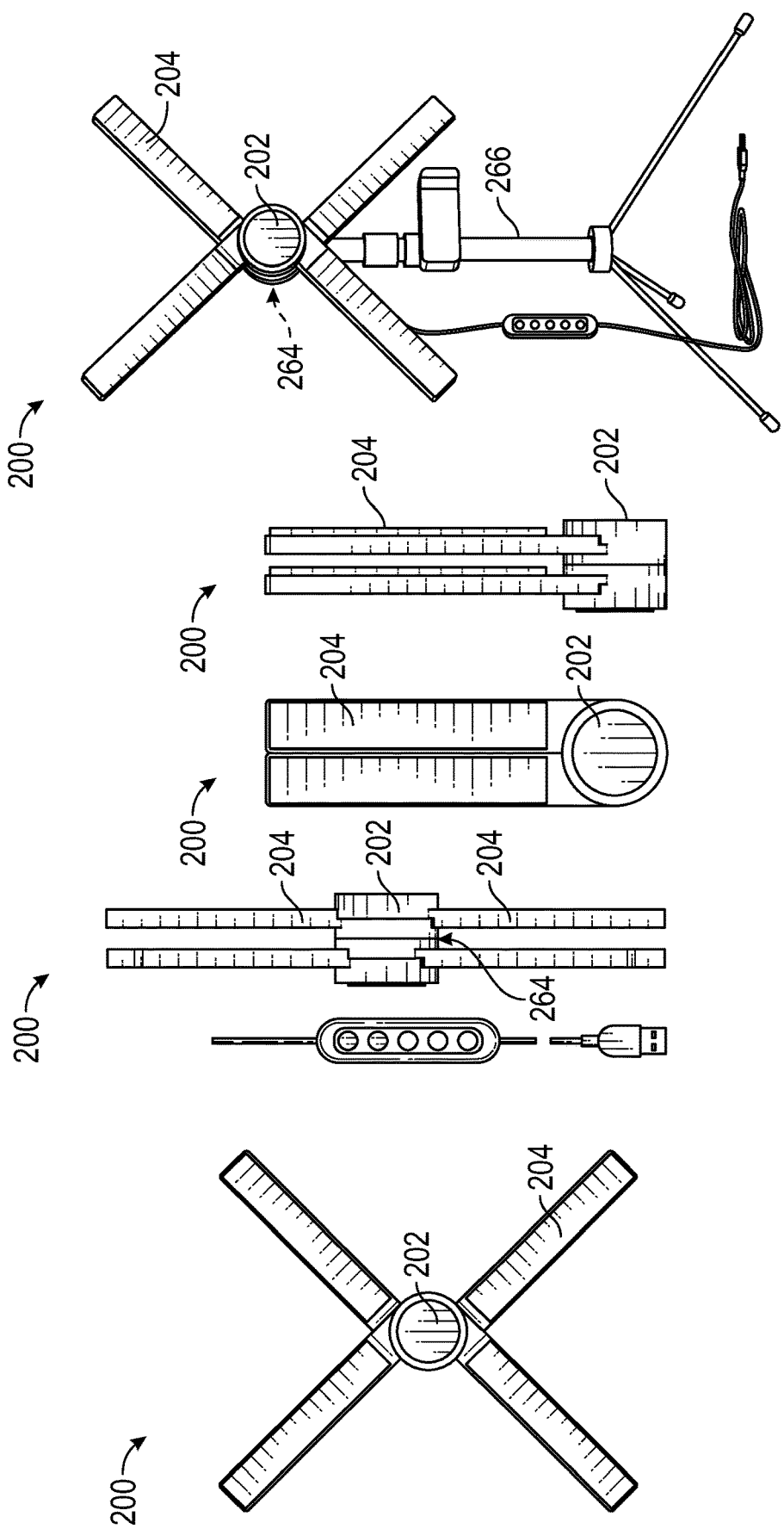
FIG. 8 illustrates an exemplary radial light according to another implementation.

Referring now to FIGS. 1 and 2, in the exemplary implementation of the light 100, the light 100 includes a base 144 that holds the hub 102. In some other examples, the light 100 does not include the base 144. For example, FIG. 8 illustrates a light 200 that includes a hub 202 and one or more arms 204 extending from the hub 202 without including a base that holds the hub 204.

Referring again to FIGS. 1 and 2, in some examples, the base 144 is configured to support the hub 102 on a surface 146. The exemplary implementation of the base 144 includes a pedestal 148 that extends a height from a foot 150 of the pedestal 148 to a top 152 of the pedestal 148. As shown herein, the hub 102 is held by the base 144 at the top 152 of the pedestal 148. However, the hub 102 may be held by the base 144 at any location along the height of the pedestal 148, for example at an approximate midpoint of the height, an approximate quarter point of the height, an approximate three-quarter point of the height, etc.

In some examples, the pedestal 148 of the base 144 includes a cradle 154 that extends between the foot 150 and the top 152 of the pedestal 148. As shown in FIGS. 1 and 4, the cradle 154 is configured to receive the arms 104 therein when the arms 104 are in the folded angular positions F thereof. The cradle 154 may facilitate reducing the size, footprint, form-factor, and/or the like of the light 100 in the collapsed configuration, for example by providing a space within the base 144 wherein the arms 104 can nest together in the folded angular positions F.

Optionally, the foot 150 of the base 144 includes a support pad 156 (not visible in FIG. 1) that extends along an underside 158 of the foot 150. The support pad 156 facilitates stabilizing the base 144, and thus the light 100, on the surface 146. The support pad 156 may be integrally formed as a single, unitary structure with the foot 150 of the pedestal 148. In other examples, the support pad 156 is a discrete component (e.g., rubber, plastic, foam, wood, an elastomeric material, a cushioning material, etc.) that is mounted to the underside of the foot 150.

The structure, geometry, function, and/or the like of the base 144 (e.g., the pedestal 148, the foot 150, the top 152, the support pad 156, etc.) shown and/or described herein are meant only as non-limiting and exemplary. The base 144 may include any structure, geometry, function, and/or the like that enables the light 100 to function as described and/or illustrated herein (e.g., to emit light in the emission direction 138, etc.) in addition or alternative to the structure, geometry, function, and/or the like of the base 144 shown and/or described herein.

In some examples, the light 100 includes a device mount 162 for mounting one or more devices (not shown; e.g., a mobile device, a tablet device, a tablet computer, a mobile computer, a cell phone, a camera, an electronic device, a digital camera, a film camera, a portable electronic device, a personal electronic device, a touch screen, a monitor, a screen, a gaming system, etc.) to the light 100. In the exemplary implementation, the device mount 162 includes a magnetic mount that includes a magnetic component 162a that is configured to magnetically couple with one or more magnetic components (not shown) on the device. In addition or alternatively to the magnetic mount 162a, the device mount 162 may include and/or be configured to couple with any other type of mount such as, but not limited to, a clip, a clamp, a slot, a shelf, a grip (e.g., a PopSocket®, etc.), an interference fit mount, a snap fit mount, a mount that uses hook and loop fasteners, a mount that uses an adhesive pad and/or other adhesive structure, and/or the like.

In the exemplary implementation, the hub 102 includes the device mount 162, as is illustrated herein. However, any other component (e.g., the base 144, one or more arms 104, etc.) of the light 100 may additionally or alternatively include a device mount (and/or a component of a device mount).

Figure 10:
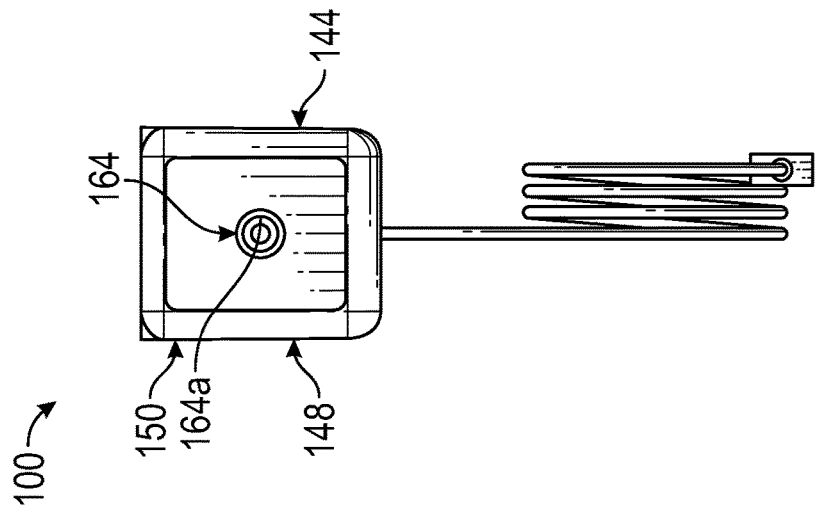
FIG. 10 is an elevational view illustrating a tri-pod mount of the radial light shown in FIGS. 1-7 and 9.
Figure 9:
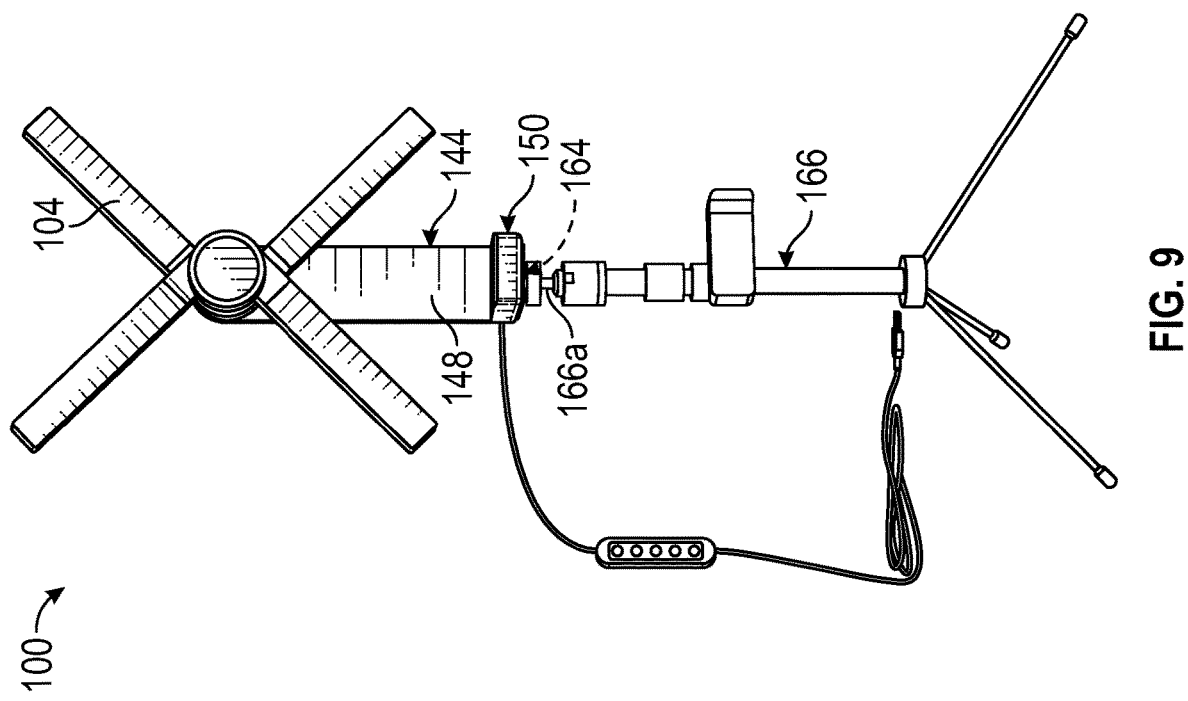
FIG. 9 is an isometric view illustrating the radial light shown in FIGS. 1-7 mounted to an exemplary tripod according to an implementation.
Figure 12:
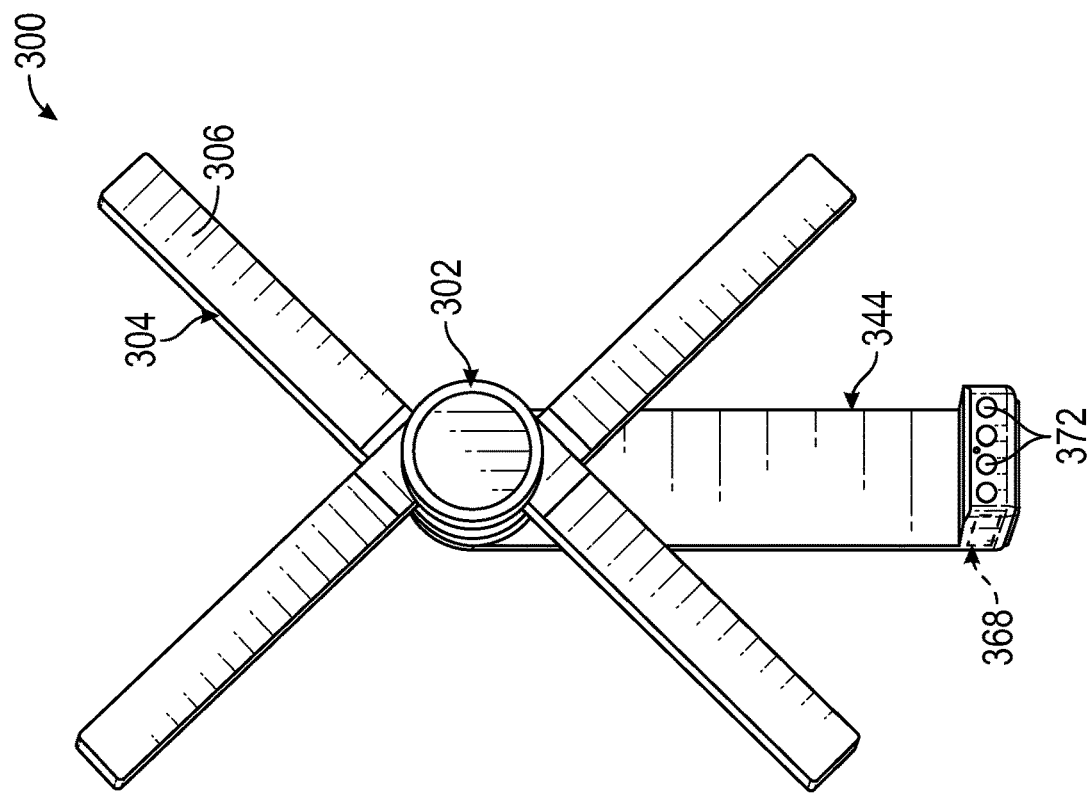
FIG. 12 is an isometric view of the radial light shown in FIG. 11 illustrating the light in a deployed configuration according to an implementation.

Referring now to FIGS. 9 and 10, some examples of the light 100 include a tri-pod mount 164. For example, in addition or alternative to being configured to be supported (e.g., by the base 144, etc.) on a surface (e.g., the surface 146, etc.), the light 100 may include the tri-pod mount 164 that is configured to mount the light 100 to an exemplary tri-pod 166 (not shown in FIG. 10). In the exemplary implementation, the tri-pod mount 164 is a threaded opening 164a (not visible in FIG. 9) that is configured to threadably receive a threaded stud 166a of the tripod 166. However, the tri-pod mount 164 may additionally or alternatively include any other structure that enables the tri-pod mount 164 to mount the light 100 to a tripod. Although the foot 150 of the pedestal 148 of the base 144 includes the tri-pod mount 164 in the exemplary implementation, any other component (e.g., the hub 102, one or more arms 104, etc.) of the light 100 and/or any other portion of the base 144 may additionally or alternatively include a tri-pod mount (and/or a component of a tri-pod mount). For example, the hub 202 shown in FIG. 8 includes a tri-pod mount 264 for mounting the light 200 to an exemplary tripod 266.

In addition or alternatively to a tri-pod mount (e.g., the tri-pod mount 164, etc.) and/or being supported on a surface, the light 100 (e.g., the base 144, the hub 102, one or more arms 104, etc.) may be configured to be mounted to another structure, such as, but not limited to: a pole; a stick; a stand; a holder; a beam; scaffolding; a platform; an electronic device, for example a mobile device, a tablet device, a tablet computer, a mobile computer, a cell phone, a camera, an electronic device, a digital camera, a film camera, a portable electronic device, a personal electronic device, a touch screen, a monitor, a screen, a gaming system, etc.; and/or the like.

Referring again to FIGS. 1-4, the exemplary implementation of the light 100 includes a power cord 168 that is operatively connected to the light sources 106 of the arms 104 such that the power cord is configured to provide the light sources 106 with electrical power from a power source (e.g., a computer, a tablet, a phone, a portable electronic device, an outlet, a wall outlet, a generator, a battery, a distributor, etc.). The power cord 168 may include any type of wired connection (e.g., a universal serial bus (USB) connection as shown herein, a cable that is hard-wired to the light 100 as shown herein, a detachable cable having a connector for being removably connected to the light 100, etc.) for receiving power from the power source.

In some implementations, the power cord 168 is configured to transmit data between the light 100 and a computer connected to the light via the power cord 168. In one example, the wired connection is a USB connection and the light 100 includes a USB transceiver and/or the like. In addition, or alternatively to a wired connection (e.g., provided by the power cord 168, etc.), the light 100 may wirelessly communicate data with a computer, such as, but not limited to, using Bluetooth®, WiFi®, a cellular network, infrared radiation, radio signals, and/or the like.

In the exemplary implementation, the power cord 168 includes a control unit 170 that includes one or more control buttons 172 that enable a user to control various functions of the light 100 (e.g., powering the light 100 on and off, changing an intensity and/or a brightness level of emitted light, changing a color of emitted light, changing a temperature of emitted light, changing a pattern of emitted light, etc.). However, in addition or alternatively to the power cord 168 as shown, one or more other components of the light 100 (e.g., the base 144, the hub 102, an arm 104, etc.) may include a control unit and/or one or more control buttons.

Although shown as including five control buttons 172, the power cord 168 may include any number of the control buttons 172 for controlling any number of different functions of the light 100. In addition or alternatively to the control buttons 172, the control unit 170 and/or the power cord 168 may include any other number, arrangement, configuration, type, and/or the like of input(s), such as, but not limited to, touch sensitive surfaces, rocker switches, joysticks, direction pads (d-pads), haptic modules, and/or the like. Optionally, haptic feedback is provided for a button click and/or a scroll vibration via a haptic module.

Figure 11:
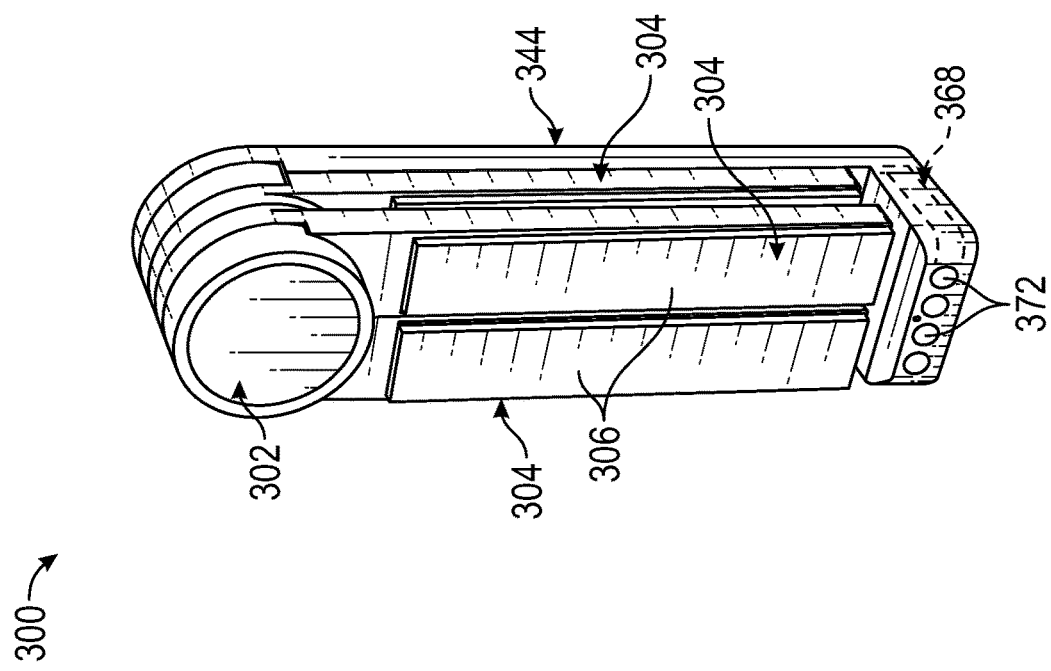
FIG. 11 is an isometric view of an exemplary radial light according to an implementation.
Figure 13:
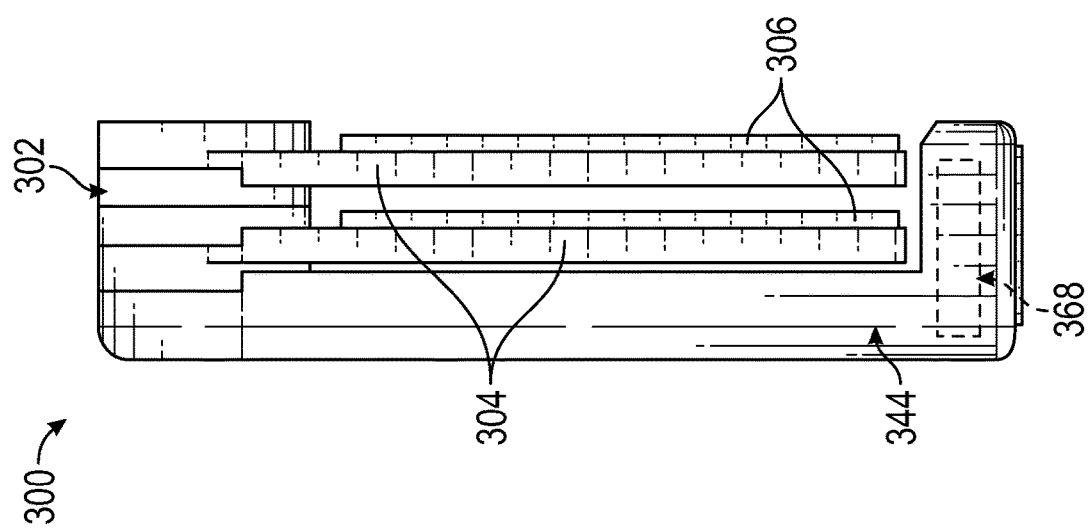
FIG. 13 is a side elevational view of the radial light shown in FIGS. 11 and 12 illustrating the light in a collapsed configuration according to an implementation.
Figure 15:
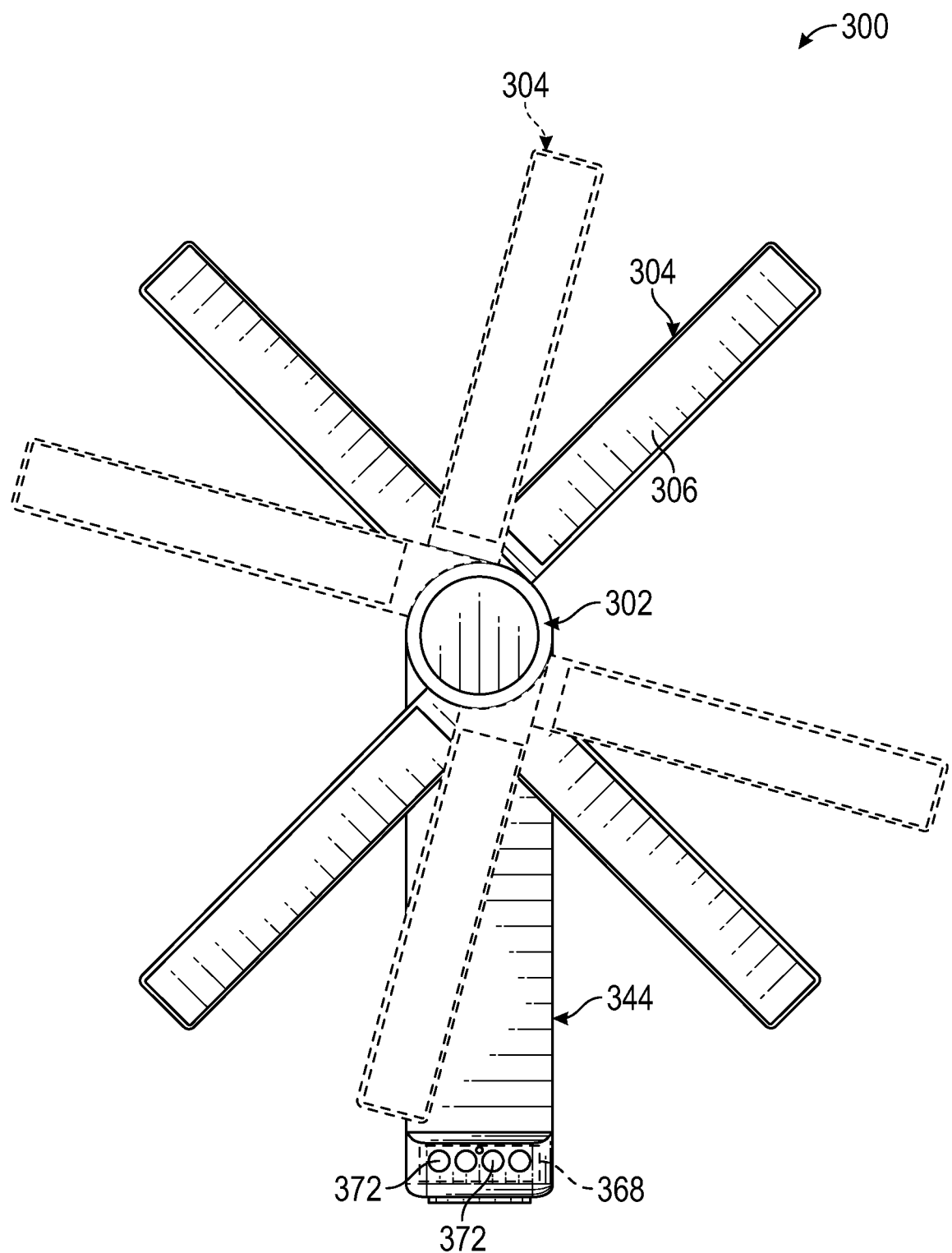
FIG. 15 is a front elevational view of the radial light shown in FIGS. 11-14 illustrating the light in the deployed configuration and illustrating intermediate angular positions of arms of the light according to an implementation.
Figure 16:
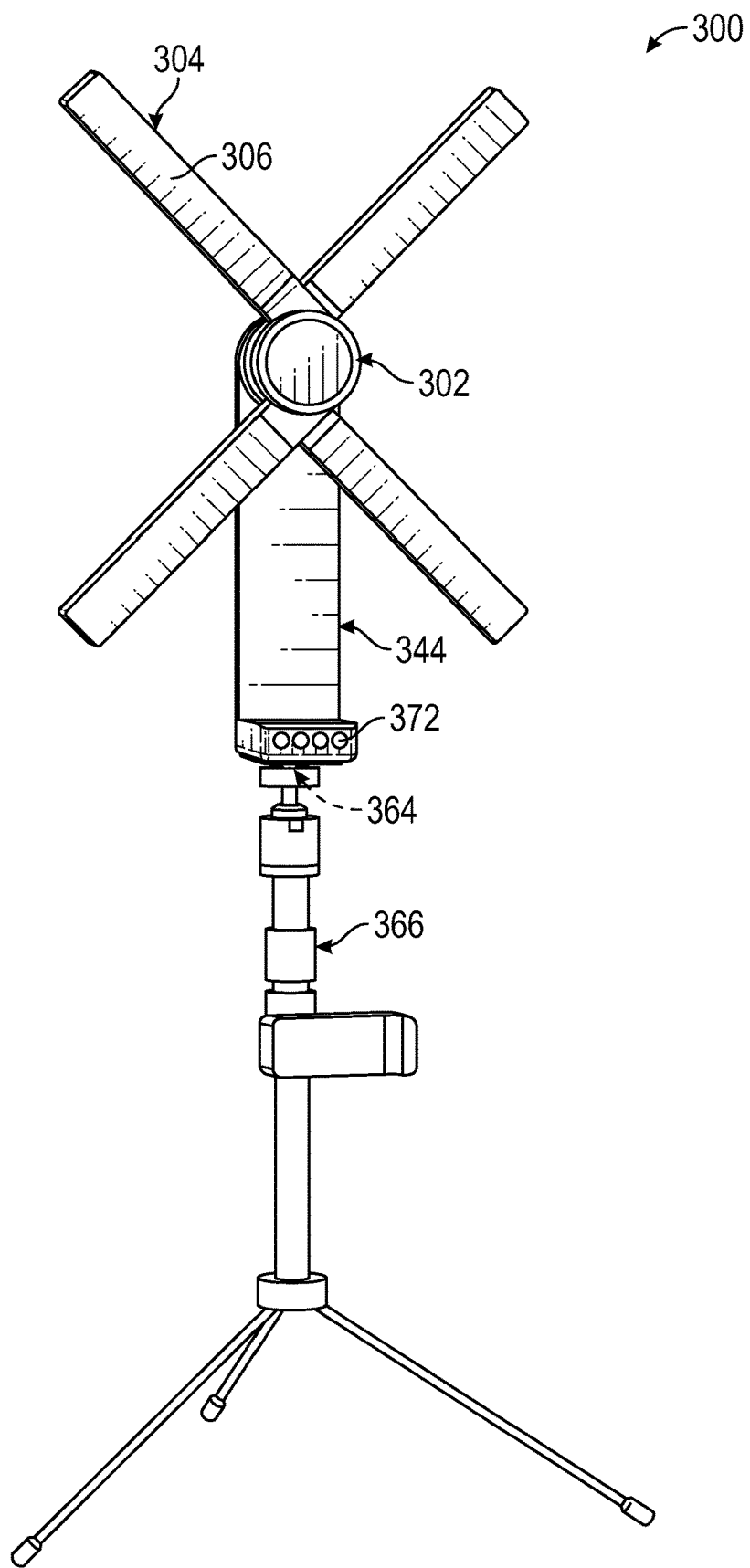
FIG. 16 is an isometric view illustrating the radial light shown in FIGS. 11-15 mounted to an exemplary tripod according to an implementation.
Figure 17:
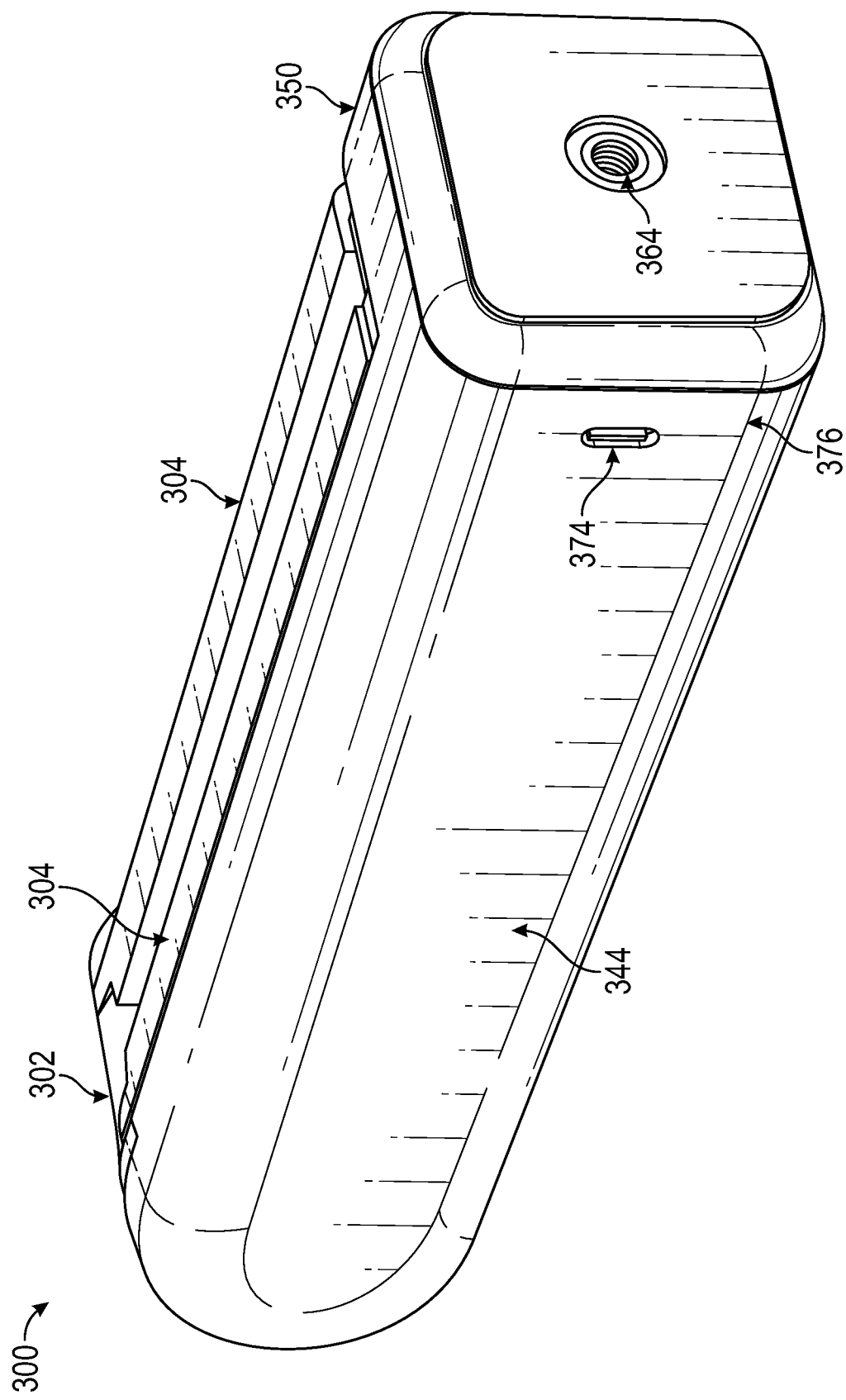
FIG. 17 is an isometric view illustrating a tri-pod mount of the radial light shown in FIGS. 11-16.

In addition or alternatively to the wired connection of the implementation of the light 100 shown in FIGS. 1-7, 9, and 10, the light 100 may be powered by a wireless connection, such as, but not limited to, one or more batteries (e.g., rechargeable batteries, disposable batteries, permanent batteries, removable batteries, etc.), cells, solar cells, and/or the like. For example, FIGS. 11-17 illustrate a radial light 300 that includes a hub 302 and one or more elongate arms 304 that extend radially outward from the hub 302. The arms 304 include light sources 306 that are configured to emit light from the arms 304. The arms 304 are configured to rotate about the hub 302 between extended angular positions and folded angular positions. The light 300 is thereby collapsible from a deployed configuration, wherein the arms 304 are at the extended angular positions, to a collapsed configuration wherein the arms 304 are at the folded angular positions. An example of the deployed configuration of the light 300 is shown in FIGS. 12 and 14-16, with FIGS. 11, 13, and 17 illustrating an example of the collapsed configuration of the light 100. As shown in FIGS. 16 and 17, the hub 302 includes an optional tri-pod mount 364 for mounting the light 300 to an exemplary tripod 366.

The light 300 includes one or more batteries 368 operatively connected to the light sources 306 of the arms 104 such that the battery 368 is configured to provide the light sources 306 with electrical power. The batter(ies) 368 may include any type of battery, such as, but not limited to, rechargeable batteries, disposable batteries, permanent batteries, removable batteries, and/or the like. In the exemplary implementation, the light 300 includes a single rechargeable battery 368 that may be configured to be recharged from any power source (e.g., a computer, a tablet, a phone, a portable electronic device, an outlet, a wall outlet, a generator, a battery, a distributor, etc.). The light 300 may include any number of the batteries 368.

Figure 14:
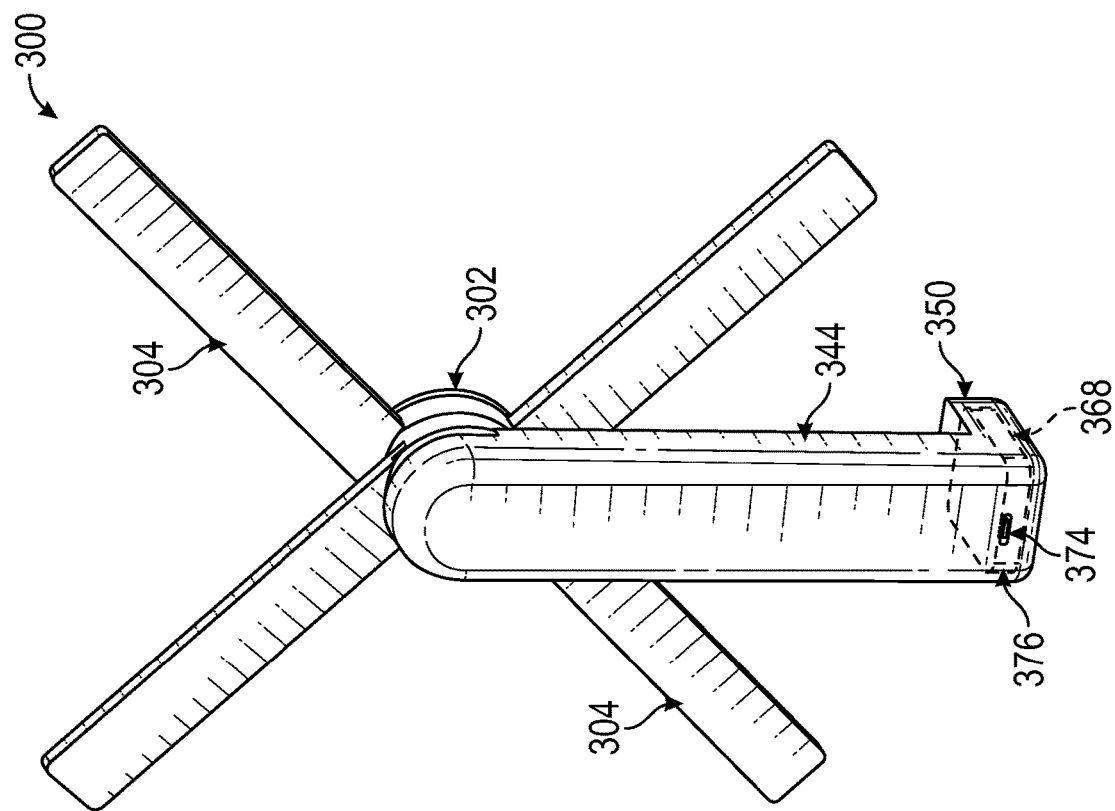
FIG. 14 is a rear isometric view of the radial light shown in FIGS. 11-13 illustrating the light in the deployed configuration according to an implementation.

In the exemplary implementation, the light 300 includes a charging port 374, as shown in FIGS. 14 and 17, that is configured to mate with an electrical cable (not shown) that is connected to a power source to enable the battery 368 to recharge without being removed from the light 300. The charging port 374 may be any type of port that is configured to mate with any type of electrical cable, wired connection, and/or the like (e.g., a USB connection, a USB receptacle port, an A/C adapter port, etc.). Although shown as being located on a rear 376 of a foot 350 of a base 344 of the light 300, the charging port 374 may additionally or alternatively be located at any other location along the light 300 (e.g., another location on the base 344, a location on the hub 302, a location on an arm 304, etc.).

In some implementations, the charging port 374 is configured to transmit data between the light 300 and a computer connected to the light via the charging port 374. In one example, the charging port 374 is a USB connection and the light 300 includes a USB transceiver and/or the like. In addition, or alternatively to a wired connection (e.g., provided by the charging port 374, etc.), the light 300 may wirelessly communicate data with a computer, such as, but not limited to, using Bluetooth®, WiFi®, a cellular network, infrared radiation, radio signals, and/or the like.

In the exemplary implementation, the base 344 of the light 300 is configured to hold the battery 368. However, although shown as being held by the foot 350 of the base 344, one or more batteries 368 may additionally or alternatively be located at any other location along the light 300 and/or be held by any other component of the light 300 (e.g., another location along the base 344, held by the hub 302, held by an arm 304, etc.) of the light 300 may additionally or alternatively hold the batter(ies) 368.

The light 300 includes one or more control buttons 372 that enable a user to control various functions of the light 300 (e.g., powering the light 100 on and off, changing an intensity and/or a brightness level of emitted light, changing a color of emitted light, changing a temperature of emitted light, changing a pattern of emitted light, etc.). In the exemplary implementation, the foot 350 of the base 344 includes the control buttons 372, however, in addition or alternatively to the foot of the base 344 as shown, one or more control buttons 372 may be located at another location on the base 344, a location on the hub 302, a location on an arm 304, and/or the like.

Figure 18:
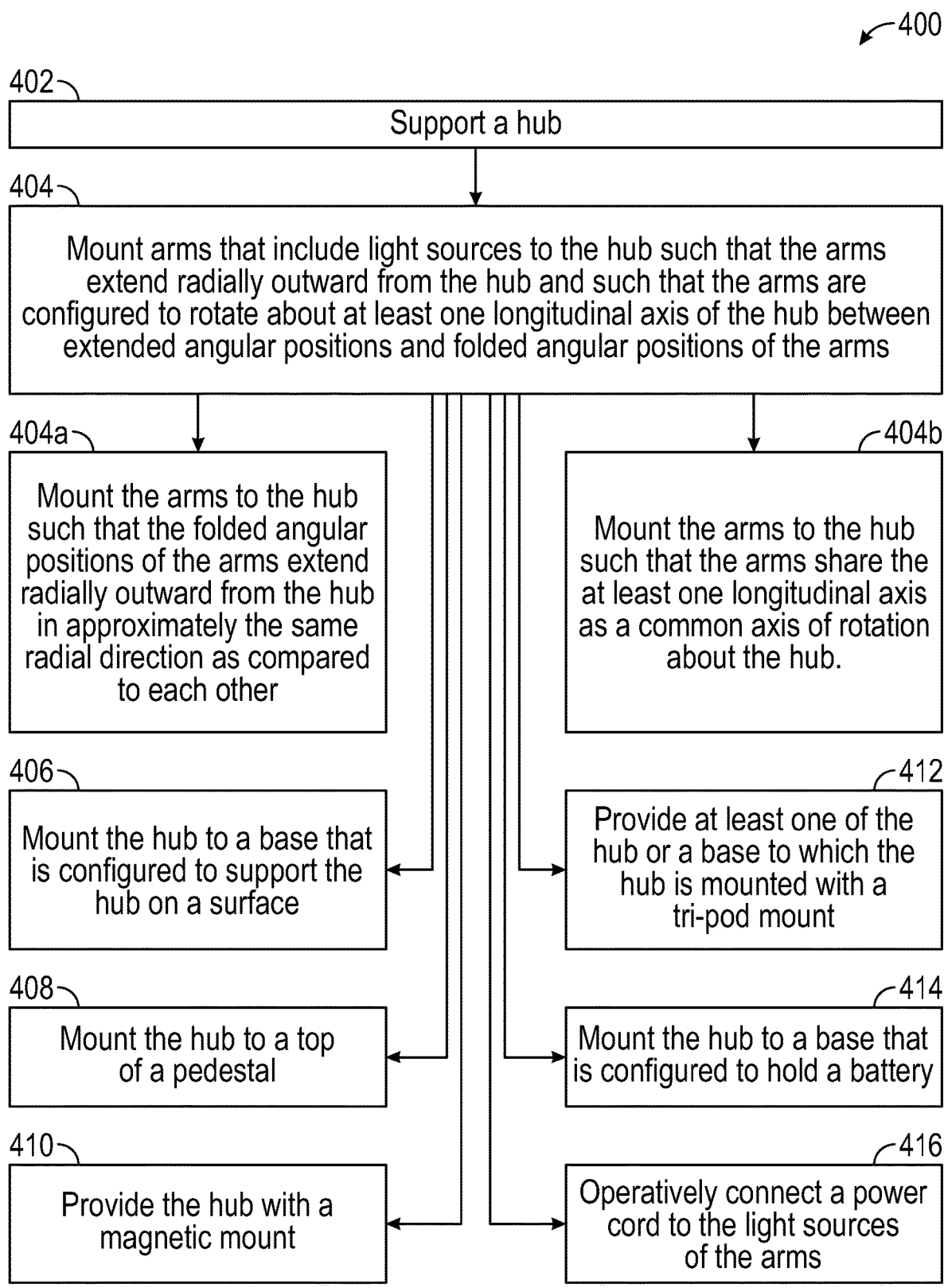
FIG. 18 is a flow chart illustrating an exemplary method for assembling a light according to an implementation.

FIG. 18 illustrates a method 400 for assembling a light (e.g., the light 100 shown in FIGS. 1-7, 9, and 10, the light 200 shown in FIG. 8, the light 300 shown in FIGS. 11-17, etc. The method 400 includes supporting, at 402, a hub. At 404, the method 400 includes mounting arms that include light sources to the hub such that the arms extend radially outward from the hub and such that the arms are configured to rotate about at least one longitudinal axis of the hub between extended angular positions and folded angular positions of the arms.

In some implementations, mounting at 404 the arms to the hub includes mounting, at 404a, the arms to the hub such that the folded angular positions of the arms extend radially outward from the hub in approximately the same radial direction as compared to each other.

Optionally, mounting at 404 the arms to the hub includes mounting, at 404b, the arms to the hub such that the arms share the at least one longitudinal axis as a common axis of rotation about the hub.

In some implementations, the at least one longitudinal axis is a central longitudinal axis of the hub.

In some examples, the method 400 further includes mounting, at 406, the hub to a base that is configured to support the hub on a surface.

Optionally, the method 400 further includes mounting, at 408, the hub to a top of a pedestal.

In some implementations, the method 400 further includes providing, at 410, the hub with a magnetic mount.

Optionally, the method 400 further includes providing, at 412, at least one of the hub or a base to which the hub is mounted with a tri-pod mount.

Optionally, the method 400 further includes mounting, at 414, the hub to a base that is configured to hold a battery.

In some implementations, the method 400 further includes operatively connecting, at 416, a power cord to the light sources of the arms.

In addition, or alternative to what is described above, the functionality described for a light is performed, at least in part, by one or more hardware logic components contained within the light (e.g., within a hub, within a base, etc.). For example, and without limitation, illustrative types of hardware logic components that are optionally used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs) and Computer Processing Units (CPUs). The one or more hardware logic components are operable to receive and transmit data between components of the light. The one or more hardware logic components may be further operable to control the receiving and transmission of data between components within the light using one or more protocols. In this manner, devices (e.g., a light source, etc.) within the arms may be controlled by the one or more hardware logic components. If a component of the light comprises one or more sensors, data collected from such one or more sensors may be transmitted to the one or more hardware logic components. The one or more hardware logic components may be yet further operable to receive and transmit data between components within the light and a connected computer.

The following clauses describe further aspects:

Clause Set A:

A1. A light comprising:

a hub; and an arm extending radially outward from the hub, the arm comprising a light source configured to emit light from the arm, the arm being rotatably connected to the hub such that the arm is configured to rotate about a longitudinal axis of the hub between an extended angular position and a folded angular position, wherein the arm extends radially outward from the hub in a different radial direction in the extended angular position as compared to the folded angular position.

A2. The light of any preceding clause, wherein the light comprises a plurality of arms that, in the extended angular positions, extend radially outward from the hub in different radial directions as compared to each other.

A3. The light of any preceding clause, wherein the light comprises a plurality of arms that, in the folded angular positions, extend radially outward from the hub in approximately the same radial direction as compared to each other.

A4. The light of any preceding clause, wherein the light comprises first and second pairs of arms.

A5. The light of any preceding clause, wherein the light comprises a plurality of arms that share the longitudinal axis as a common axis of rotation about the hub.

A6. The light of any preceding clause, wherein the longitudinal axis of the hub is a central longitudinal axis of the hub.

A7. The light of any preceding clause, wherein the arm is configured to be held in an intermediate angular position wherein the arm extends radially outward from the hub in a different radial direction as compared to the extended and folded angular positions.

A8. The light of any preceding clause, wherein the hub comprises a detent configured to hold the arm in the extended angular position or the folded angular position.

A9. The light of any preceding clause, further comprising a base that holds the hub, the base being configured to support the hub on a surface.

A10. The light of any preceding clause, further comprising a base comprising a pedestal extending a height from a foot to a top, the hub being held by the base at the top.

A11. The light of any preceding clause, further comprising a base comprising a pedestal extending a height from a foot to a top, the foot comprising a tri-pod mount.

A12. The light of any preceding clause, further comprising a base that is configured to hold a battery for providing the light source with electrical power.

A13. The light of any preceding clause, further comprising a base that includes a control button.

A14. The light of any preceding clause, further comprising a base comprising a pedestal extending a height from a foot to a top, the pedestal comprising a cradle extending between the foot and the top, wherein the cradle is configured to receive the arm therein in the folded angular position of the arm.

A15. The light of any preceding clause, further comprising a battery operatively connected to the light source such that the battery is configured to provide the light source with electrical power.

A16. The light of any preceding clause, further comprising a power cord operatively connected to the light source such that the power cord is configured to provide the light source with electrical power from a power source.

A17. The light of any preceding clause, further comprising a power cord operatively connected to the light source for providing the light source with electrical power from a power source, the power cord comprising a control button.

A18. The light of any preceding clause, further comprising a tri-pod mount.

A19. The light of any preceding clause, further comprising a magnetic mount.

A20. The light of any preceding clause, wherein the hub comprises a magnetic mount.

A21. The light of any preceding clause, wherein at least one of a size, footprint, or form-factor of the light is reduced in the folded angular position of the arm as compared to extended angular position of the arm.

A22. The light of any preceding clause, wherein the light is portable.

A23. The light of any preceding clause, wherein the light is collapsible.

A24. The light of any preceding clause, wherein the light is configured to be hand-held such that the light is configured to be operated while held by a user's hand.

A25. The light of any preceding clause, wherein the light source comprises a light emitting diode (LED).

A26. The light of any preceding clause, wherein the light source comprises a fluorescent bulb.

A27. The light of any preceding clause, wherein the light source comprises a strobe light.

A28. The light of any preceding clause, wherein the light source comprises a constant light.

A29. The light of any preceding clause, wherein the light is configured to emit approximately even, diffuse lighting.

Clause Set B:

B1. A light comprising:

a hub; and a plurality of arms held by the hub such that the arms extend radially outward from the hub, each respective arm comprising a light source configured to emit light from the arm, the arms being rotatably connected to the hub such that the arms are configured to rotate about the hub between extended angular positions and folded angular positions, wherein the arms are configured to rotate between the extended and folded angular positions about approximately parallel axes of rotation.

B2. The light of any preceding clause, wherein the extended angular positions of the arms extend radially outward from the hub in different radial directions as compared to each other.

B3. The light of any preceding clause, wherein the folded angular positions of the arms extend radially outward from the hub in approximately the same radial direction as compared to each other.

B4. The light of any preceding clause, wherein the arms comprise first and second pairs of the arms, the extended angular positions of the first and second pairs being approximately evenly spaced apart from each other along a perimeter of the hub.

B5. The light of any preceding clause, wherein the approximately parallel axes of rotation are a shared common axis of rotation about the hub.

B6. The light of any preceding clause, wherein the arms are configured to be held in intermediate angular positions wherein each arm extends radially outward from the hub in a different radial direction as compared to the extended and folded angular positions of the arm.

B7. The light of any preceding clause, wherein the hub comprises a detent configured to hold an arm of the arms in the extended angular position or the folded angular position.

B8. The light of any preceding clause, further comprising a base that holds the hub, the base being configured to support the hub on a surface.

B9. The light of any preceding clause, further comprising a base comprising a pedestal extending a height from a foot to a top, the hub being held by the base at the top.

B10. The light of any preceding clause, further comprising a base comprising a pedestal extending a height from a foot to a top, the foot comprising a tri-pod mount.

B11. The light of any preceding clause, further comprising a base that is configured to hold at least one battery for providing the light sources of the arms with electrical power.

B12. The light of any preceding clause, further comprising a base that includes a control button.

B13. The light of any preceding clause, further comprising a base comprising a pedestal extending a height from a foot to a top, the pedestal comprising a cradle extending between the foot and the top, wherein the cradle is configured to receive the arms therein in the folded angular positions of the arms.

B14. The light of any preceding clause, further comprising at least one battery operatively connected to the light sources of the arms such that the at least one battery is configured to provide the light sources with electrical power.

B15. The light of any preceding clause, further comprising a power cord operatively connected to the light sources of the arms such that the power cord is configured to provide the light sources with electrical power from a power source.

B16. The light of any preceding clause, further comprising a power cord operatively connected to the light sources of the arms for providing the light sources with electrical power from a power source, the power cord comprising a control button.

B17. The light of any preceding clause, further comprising a tri-pod mount.

B18. The light of any preceding clause, wherein at least one of a size, footprint, or form-factor of the light is reduced in the folded angular positions of the arms as compared to extended angular positions of the arms.

B19. The light of any preceding clause, wherein the light is portable.

B20. The light of any preceding clause, wherein the light is collapsible.

B21. The light of any preceding clause, wherein the light is configured to be hand-held such that the light is configured to be operated while held by a user's hand.

B22. The light of any preceding clause, wherein the light sources of the arms comprise a light emitting diode (LED).

B23. The light of any preceding clause, wherein the light sources of the arms comprise a fluorescent bulb.

B24. The light of any preceding clause, wherein the light sources of the arms comprise a strobe light.

B25. The light of any preceding clause, wherein the light sources of the arms comprise a constant light.

B26. The light of any preceding clause, wherein the light is configured to emit approximately even, diffuse lighting.

B27. The light of any preceding clause, wherein the hub comprises a magnetic mount.

Clause Set C:

C1. A light comprising:
a hub; and
a plurality of arms held by the hub such that the arms extend radially outward from the hub, each respective arm comprising a light source configured to emit light from the arm in an emission direction, the arms being rotatably connected to the hub such that the arms are configured to rotate about the hub between extended angular positions and folded angular positions, wherein the arms are configured to rotate between the extended and folded angular positions about at least one axis of rotation that extends approximately parallel to the emission direction.

C2. The light of any preceding clause, wherein the folded angular positions of the arms extend radially outward from the hub in approximately the same radial direction as compared to each other.

C3. The light of any preceding clause, wherein the arms comprise first and second pairs of the arms, the extended angular positions of the first and second pairs being approximately evenly spaced apart from each other along a perimeter of the hub.

C4. The light of any preceding clause, wherein the at least one axis of rotation is shared between the arms as a common axis of rotation.

C5. The light of any preceding clause, wherein the arms are configured to be held in intermediate angular positions wherein each arm extends radially outward from the hub in a different radial direction as compared to the extended and folded angular positions of the arm.

C6. The light of any preceding clause, wherein the hub comprises a detent configured to hold an arm of the arms in the extended angular position or the folded angular position of the arm.

C7. The light of any preceding clause, further comprising a base that holds the hub, the base being configured to support the hub on a surface.

C8. The light of any preceding clause, further comprising a base comprising a pedestal extending a height from a foot to a top, the hub being held by the base at the top.

C9. The light of any preceding clause, further comprising a base comprising a pedestal extending a height from a foot to a top, the foot comprising a tri-pod mount.

C10. The light of any preceding clause, further comprising a base that is configured to hold at least one battery for providing the light sources of the arms with electrical power.

C11. The light of any preceding clause, further comprising a base that includes a control button.

C12. The light of any preceding clause, further comprising a base comprising a pedestal extending a height from a foot to a top, the pedestal comprising a cradle extending between the foot and the top, wherein the cradle is configured to receive the arms therein in the folded angular positions of the arms.

C13. The light of any preceding clause, further comprising at least one battery operatively connected to the light sources of the arms such that the at least one battery is configured to provide the light sources with electrical power.

C14. The light of any preceding clause, further comprising a power cord operatively connected to the light sources of the arms such that the power cord is configured to provide the light sources with electrical power from a power source.

C15. The light of any preceding clause, further comprising a power cord operatively connected to the light sources of the arms for providing the light sources with electrical power from a power source, the power cord comprising a control button.

C16. The light of any preceding clause, further comprising a tri-pod mount.

C17. The light of any preceding clause, wherein at least one of a size, footprint, or form-factor of the light is reduced in the folded angular positions of the arms as compared to extended angular positions of the arms.

C18. The light of any preceding clause, wherein the light is at least one of portable, collapsible, or configured to be hand-held such that the light is configured to be operated while held by a user's hand.

C19. The light of any preceding clause, wherein the light sources of the arms comprise at least one of a light emitting diode (LED), a fluorescent bulb, a strobe light, or a constant light.

C20. The light of any preceding clause, wherein the hub comprises a magnetic mount.

Clause Set D:

D1. A light comprising:

a hub; and an arm extending radially outward from the hub, the arm comprising a light source configured to emit light from the arm, the arm being rotatably connected to the hub such that the arm is configured to rotate about a central axis of the hub between an extended angular position and a folded angular position, wherein the arm extends radially outward from the hub in a different radial direction in the extended angular position as compared to the folded angular position.

D2. The light of any preceding clause, wherein the light comprises a plurality of arms that, in the folded angular positions, extend radially outward from the hub in approximately the same radial direction as compared to each other.

D3. The light of any preceding clause, wherein the light comprises a plurality of arms that share the central axis as a common axis of rotation about the hub.

D4. The light of any preceding clause, wherein the central axis of the hub is a central longitudinal axis of the hub.

D5. The light of any preceding clause, wherein the light sources are configured to emit light from the arms in an emission direction, and wherein the central axis extends approximately parallel to the emission direction.

D6. The light of any preceding clause, wherein the arm is configured to be held in an intermediate angular position wherein the arm extends radially outward from the hub in a different radial direction as compared to the extended and folded angular positions.

D7. The light of any preceding clause, wherein the hub comprises a detent configured to hold the arm in the extended angular position or the folded angular position.

D8. The light of any preceding clause, further comprising a base that holds the hub, the base being configured to support the hub on a surface.

D9. The light of any preceding clause, further comprising a base comprising a pedestal extending a height from a foot to a top, the hub being held by the base at the top.

D10. The light of any preceding clause, further comprising a base that is configured to hold a battery for providing the light source with electrical power.

D11. The light of any preceding clause, further comprising a power cord operatively connected to the light source such that the power cord is configured to provide the light source with electrical power from a power source.

Clause Set E:

E1. A light comprising:

a hub;

a plurality of arms held by the hub such that the arms extend radially outward from the hub, each respective arm comprising a light source configured to emit light from the arm, the arms being rotatably connected to the hub such that the arms are configured to rotate about at least one longitudinal axis of the hub between extended angular positions and folded angular positions of the arms; and a base comprising a pedestal extending a height from a foot to a top, the hub being held by the pedestal of the base.

E2. The light of any preceding clause, wherein the base is configured to support the hub on a surface.

E3. The light of any preceding clause, wherein the folded angular positions of the arms extend radially outward from the hub in approximately the same radial direction as compared to each other.

E4. The light of any preceding clause, wherein the arms comprise first and second pairs of the arms, the extended angular positions of the first and second pairs being approximately evenly spaced apart from each other along a perimeter of the hub.

E5. The light of any preceding clause, wherein the arms share the at least one longitudinal axis as a common axis of rotation about the hub.

E6. The light of any preceding clause, wherein the foot of the base comprises a tri-pod mount.

E7. The light of any preceding clause, wherein the base is configured to hold at least one battery for providing the light sources with electrical power.

E8. The light of any preceding clause, wherein the base comprises a control button.

E9. The light of any preceding clause, wherein the of the base pedestal comprises a cradle extending between the foot and the top, wherein the cradle is configured to receive the arms therein in the folded angular positions of the arms.

E10. The light of any preceding clause, further comprising at least one battery held by the base and operatively connected to the light sources of the arms such that the at least one battery is configured to provide the light sources with electrical power.

E11. The light of any preceding clause, further comprising a power cord operatively connected to the light sources of the arms such that the power cord is configured to provide the light sources with electrical power from a power source.

E12. The light of any preceding clause, further comprising a power cord operatively connected to the light sources of the arms for providing the light sources with electrical power from a power source, the power cord comprising a control button.

E13. The light of any preceding clause, wherein the base comprises a power cord operatively connect to the light sources of the arms such that the power cord is configured to provide the light sources with electrical power from a power source.

Clause Set F:

F1. A method for assembling a light, the method comprising:

supporting a hub; and mounting arms that include light sources to the hub such that the arms extend radially outward from the hub and such that the arms are configured to rotate about at least one longitudinal axis of the hub between extended angular positions and folded angular positions of the arms.

F2. The method of any preceding clause, wherein mounting the arms to the hub comprises mounting the arms to the hub such that the folded angular positions of the arms extend radially outward from the hub in approximately the same radial direction as compared to each other.

F3. The method of any preceding clause, wherein mounting the arms to the hub comprises mounting the arms to the hub such that the arms share the at least one longitudinal axis as a common axis of rotation about the hub.

F4. The method of any preceding clause, wherein the at least one longitudinal axis is a central longitudinal axis of the hub.

F5. The method of any preceding clause, further comprising mounting the hub to a base that is configured to support the hub on a surface.

F6. The method of any preceding clause, further comprising mounting the hub to a top of a pedestal.

F7. The method of any preceding clause, further comprising providing the hub with a magnetic mount.

F8. The method of any preceding clause, further comprising providing at least one of the hub or a base to which the hub is mounted with a tri-pod mount.

F9. The method of any preceding clause, further comprising mounting the hub to a base that is configured to hold a battery.

F10. The method of any preceding clause, further comprising operatively connecting a power cord to the light sources of the arms.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

Various functions of the lights disclosed herein may be performed, in some examples, by software using one or more processors (not shown; e.g., microprocessors, etc.) for processing computer executable instructions. In some implementations, platform software comprising an operating system and/or any other suitable platform software is provided on the mouse modules and/or input devices disclosed herein to enable application software to be executed thereon. Computer executable instructions are provided using any computer-readable media. Computer-readable media include, for example and without limitation, computer storage media and communications media. Computer storage media, such as a memory, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media embody computer readable instructions, data structures, program modules, and/or the like in a modulated data signal, such as a carrier wave and/or other transport mechanism. As defined herein, computer storage media do not include communication media. Therefore, a computer storage medium should not be interpreted to be a propagating signal per se. Propagated signals per se are not examples of computer storage media.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one implementation or can relate to several implementations. The implementations are not limited to those that solve any or all of the stated problems or those that have any or all of the stated benefits and advantages. It will further be understood that reference to 'an' item refers to one or more of those items.

The order of execution or performance of the operations in examples of the present application illustrated and described herein is not essential, unless otherwise specified. That is, the operations can be performed in any order, unless otherwise specified, and examples of the application can include additional or fewer operations than those disclosed herein. For example, it is contemplated that executing or performing a particular operation before, contemporaneously with, or after another operation (e.g., different steps, etc.) is within the scope of aspects and implementations of the application.

The term "comprising" is used in this specification to mean including the feature(s) or act(s) followed thereafter, without excluding the presence of one or more additional features or acts. The terms "comprising," "including," and "having" are intended to be inclusive and mean that there can be additional elements other than the listed elements. In other words, the use of "including," "comprising," "having," "containing," "involving," and variations thereof; is meant to encompass the items listed thereafter and additional items. Accordingly, and for example, unless explicitly stated to the contrary, implementations "comprising" or "having" an element or a plurality of elements having a particular property can include additional elements not having that property. Further, references to "one implementation" or "an implementation" are not intended to be interpreted as excluding the existence of additional implementations that also incorporate the recited features. The term "exemplary" is intended to mean "an example of".

When introducing elements of aspects of the application or the examples thereof, the articles "a," "an," "the," and "said" are intended to mean that there are one or more of the elements. In other words, the indefinite articles "a", "an", "the", and "said" as used in the specification and in the claims, unless clearly indicated to the contrary, should be understood to mean "at least one." Accordingly, and for example, as used herein, an element or step recited in the singular and preceded by the word "a" or "an" should be understood as not necessarily excluding the plural of the elements or steps.

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either" "one of" only one of or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the application in detail, it will be apparent that modifications and variations are possible without departing from the scope of aspects of the application as defined in the appended claims. As various changes could be made in the above constructions, products, and methods without departing from the scope of aspects of the application, it is intended that all matter contained in the above description and shown in the accompanying drawings shall be interpreted as illustrative and not in a limiting sense.

It is to be understood that the above description is intended to be illustrative, and not restrictive. For example, the above-described implementations (and/or aspects thereof) can be used in combination with each other. In addition, many modifications can be made to adapt a particular situation or material to the teachings of the various implementations of the application without departing from their scope. While the dimensions and types of materials described herein are intended to define the parameters of the various implementations of the application, the implementations are by no means limiting and are example implementations. Many other implementations will be apparent to those of ordinary skill in the art upon reviewing the above description. The scope of the various implementations of the application should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the application, including the best mode, and also to enable any person of ordinary skill in the art to practice the various implementations of the application, including making and using any devices or systems and performing any incorporated methods. The patentable scope of the various implementations of the application is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

The invention claimed is:

1. A light comprising:
   a hub; and
   a plurality of arms extending radially outward from the hub, each respective arm comprising a light source configured to emit light from the respective arm, the respective arm being rotatably connected to the hub such that the respective arm is configured to rotate about a longitudinal axis of the hub between an extended angular position and a folded angular position, wherein the respective arm extends radially outward from the hub in a different radial direction in the extended angular position as compared to the folded angular position, wherein the radial direction of the respective arm in the extended angular position is variable by moving the respective arm to an intermediate angular position to emit various different patterns of light.

2. The light of claim 1, wherein each respective arm of the plurality of arms extend radially outward from the hub in approximately the same radial direction as compared to each other in the folded angular position.

3. The light of claim 1, wherein the longitudinal axis of the hub is a central longitudinal axis of the hub.

4. The light of claim 1, wherein the plurality of arms share a common axis of rotation about the hub.

5. The light of claim 1, wherein intermediate angular position is a different radial direction as compared to the extended and folded angular positions.

6. The light of claim 1, further comprising a base that holds the hub, the base being configured to support the hub on a surface.

7. The light of claim 1, further comprising a base that is configured to hold a battery for providing the light source with electrical power.

8. The light of claim 1, further comprising a power cord operatively connected to the light source such that the power cord is configured to provide the light source with electrical power from a power source.

9. The light of claim 1, further comprising at least one of a tri-pod mount or a magnetic mount.

10. The light of claim 1, wherein at least one of a size, footprint, or
   form-factor of the light is reduced in the folded angular position of the plurality of arms as compared to the extended angular position of the plurality of arms.

11. A light comprising:
   a hub; and
   a plurality of arms held by the hub such that the plurality of arms extend radially outward from the hub, each respective arm comprising a light source configured to emit light from the respective arm in an emission direction, the plurality of arms being rotatably connected to the hub such that the plurality of arms are configured to rotate about the hub between extended angular positions and folded angular positions, wherein the plurality of arms are configured to rotate between the extended and folded angular positions about at least one axis of rotation that extends approximately parallel to the emission direction.

12. The light of claim 11, wherein the folded angular positions of the plurality of arms extend radially outward from the hub in approximately the same radial direction as compared to each other.

13. The light of claim 11, wherein the at least one axis of rotation is shared between the plurality of arms as a common axis of rotation.

14. The light of claim 11, wherein the plurality of arms are configured to be held in intermediate angular positions wherein each arm extends radially outward from the hub in a different radial direction as compared to the extended and folded angular positions of the arm.

15. The light of claim 11, wherein the hub comprises a detent configured to hold an arm of the plurality of arms in the extended angular position or the folded angular position of the arm.

16. The light of claim 11, further comprising a base that holds the hub, the base being configured to support the hub on a surface.

17. The light of claim 11, further comprising a base comprising a pedestal extending a height from a foot to a top, the pedestal comprising a cradle extending between the foot and the top, wherein the cradle is configured to receive the plurality of arms therein in the folded angular positions of the plurality of arms.

18. The light of claim 11, wherein at least one of a size, footprint, or form-factor of the light is reduced in the folded angular positions of the plurality of arms as compared to extended angular positions of the plurality of arms.

19. A method for assembling a light, the method comprising:
   supporting a hub; and
   mounting arms that include light sources to the hub such that the arms extend radially outward from the hub and such that the arms are configured to rotate about at least one longitudinal axis of the hub between extended angular positions and folded angular positions of the arms, each respective arm comprising a light source configured to emit light from the respective arm in a common emission direction, wherein the arms are configured to rotate between the extended and folded angular positions about the at least one longitudinal axis that extends approximately perpendicular to the common emission direction.

20. The method of claim 19, wherein mounting the arms to the hub comprises mounting the arms to the hub such that the folded angular positions of the arms extend radially outward from the hub in approximately the same radial direction as compared to each other.

* * * * *